(12) United States Patent
Etkin

(10) Patent No.: US 7,644,032 B2
(45) Date of Patent: Jan. 5, 2010

(54) ADAPTIVE MATCHING PROGRAM AND SYSTEM FOR CORPORATE MEETING PLANNERS AND HOSPITALITY PROVIDERS

(75) Inventor: James M. Etkin, Weston, FL (US)

(73) Assignee: H.J.J. Inc., Pembroke Park, FL (US)

( * ) Notice: Subject to any disclaimer, the term of this patent is extended or adjusted under 35 U.S.C. 154(b) by 77 days.

(21) Appl. No.: 11/625,490

(22) Filed: Feb. 26, 2007

(65) Prior Publication Data
US 2008/0052217 A1    Feb. 28, 2008

Related U.S. Application Data

(63) Continuation-in-part of application No. 09/740,371, filed on Dec. 19, 2000, now Pat. No. 7,343,338.

(51) Int. Cl.
*G06Q 40/00* (2006.01)
*G06Q 10/00* (2006.01)

(52) U.S. Cl. ............................................. 705/37; 705/5

(58) Field of Classification Search .................. 705/37, 705/38, 8, 26, 1, 14, 5, 9, 36 R, 27, 35; 235/494; 708/112
See application file for complete search history.

(56) References Cited

U.S. PATENT DOCUMENTS

| | | | |
|---|---|---|---|
| 5,664,115 A | 9/1997 | Fraser | |
| 5,794,207 A | 8/1998 | Walker et al. | |
| 5,926,798 A * | 7/1999 | Carter | ........................ 705/26 |
| 6,012,045 A | 1/2000 | Barzilai et al. | |
| 6,384,850 B1 * | 5/2002 | McNally et al. | ............. 715/810 |
| 6,446,045 B1 * | 9/2002 | Stone et al. | .................... 705/26 |
| 2002/0069094 A1 * | 6/2002 | Bingham et al. | ............... 705/5 |

FOREIGN PATENT DOCUMENTS

| | | | |
|---|---|---|---|
| EP | 779759 A2 * | 6/1997 | |
| WO | WO 9625012 A1 | 8/1996 | |

(Continued)

OTHER PUBLICATIONS

Anonymous "Ask the Experts" Feb. 21, 2000. Hotel & Motel Management, V215N3 pp. 36.*

(Continued)

*Primary Examiner*—Kelly Campen
(74) *Attorney, Agent, or Firm*—Robert C. Kain, Jr.

(57) ABSTRACT

The adaptive computerized bidding method matches hospitality facility (HF) data and meeting requirement data, permits the posting of offers and responsive bidding by both HF vendors and meeting planners (MPs), analysis of the initial search results by an MP supervisor (an adaptive input), analysis of the vendor search results by a vendor promoter (adaptive output) and facilitates the exchange of data by the posting MP and the selected HF vendors. MP requirement or request for quote RFQ data (at least MP contact data, facilities requirements, date range and price) is matched to HF hotel data (at least vendor contact data, location, room quantity, date range, and meeting room data), and after adaptive and output analysis and supplemental communications to supervisors, and the system sends MP RFQ data to matching vendors after processing by the adaptive filters. Vendors respond to the MP RFQ.

47 Claims, 19 Drawing Sheets

FOREIGN PATENT DOCUMENTS

| | | | |
|---|---|---|---|
| WO | WO 9820434 A2 | * | 5/1998 |
| WO | WO 9841936 A1 | * | 9/1998 |

OTHER PUBLICATIONS

Reardon, Marguerite "Event Planner Offeres Custom Sites" Dec. 6, 1999, Information Week, p. 44.*

Foster Camie "Hawaii Tourism Pros Have High Hopes for HTA's New Strategy" Jul. 12, 1999, Travel Agent, V295N12, p. 104.*

Cline, Roger S. "Investing in Technology" Dec. 1997 Lodging Hospitality, V53N12, p. 59(3).*

Windsor Consultants, Meeting Auctions Bulletin Board, Tucson, Arizona (Feb. 29, 2000) (2 pgs.).

Priceline.com Hotels, Name Your Price for Hotel Rooms (Feb. 29, 2000) (2 pgs.).

StarCite.com Debuts as First End-to-End Solution for $100 Billion Meeting Planning Industry, Business Wire (Oct. 27, 1999) (4 pgs.).

* cited by examiner

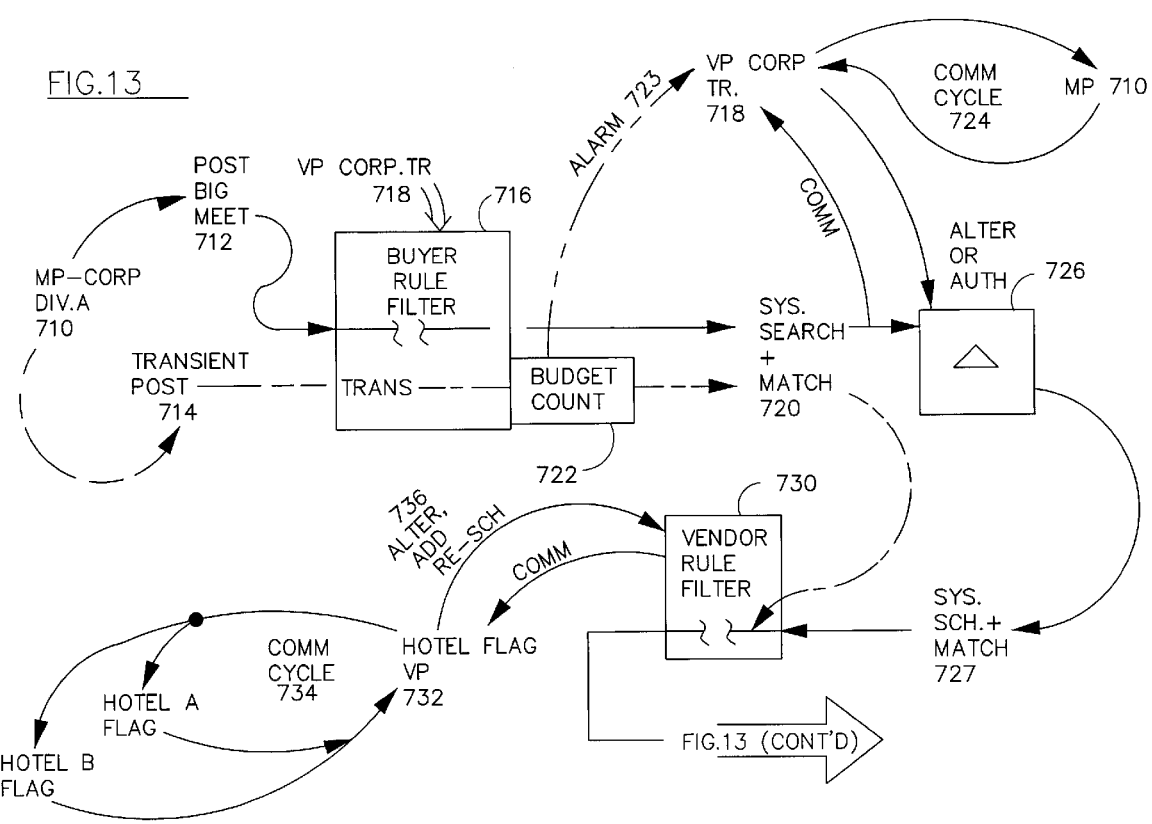

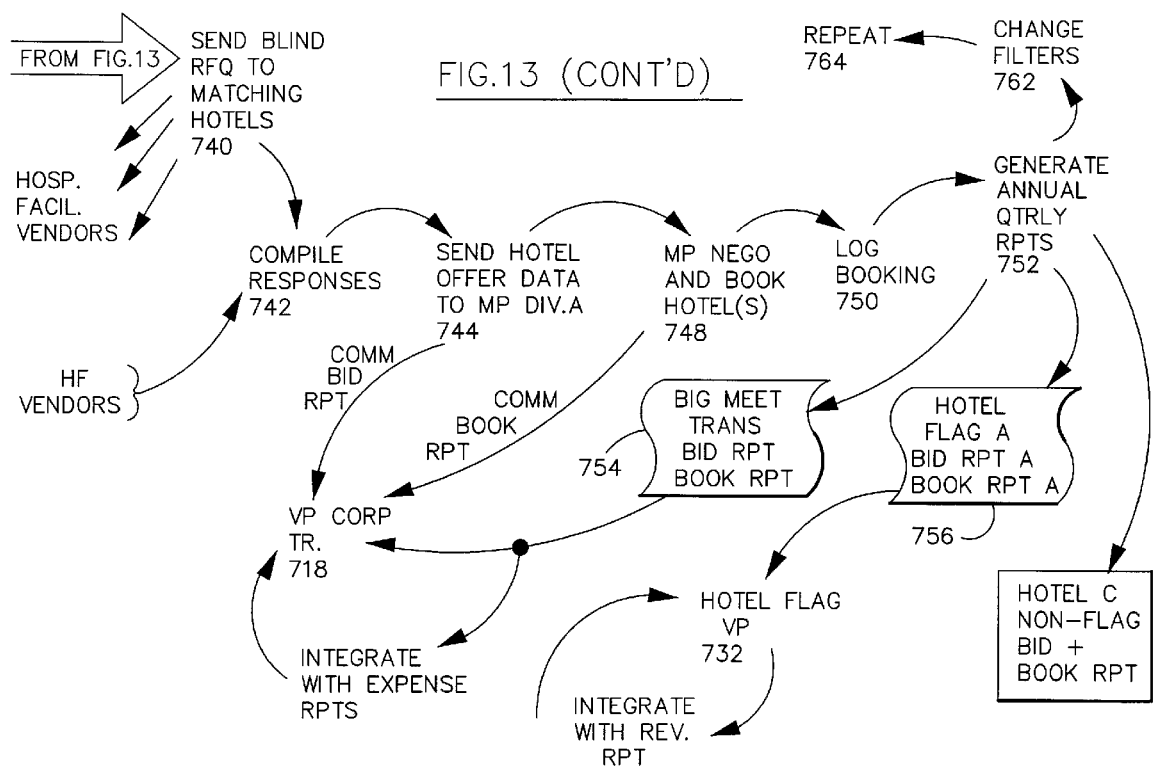

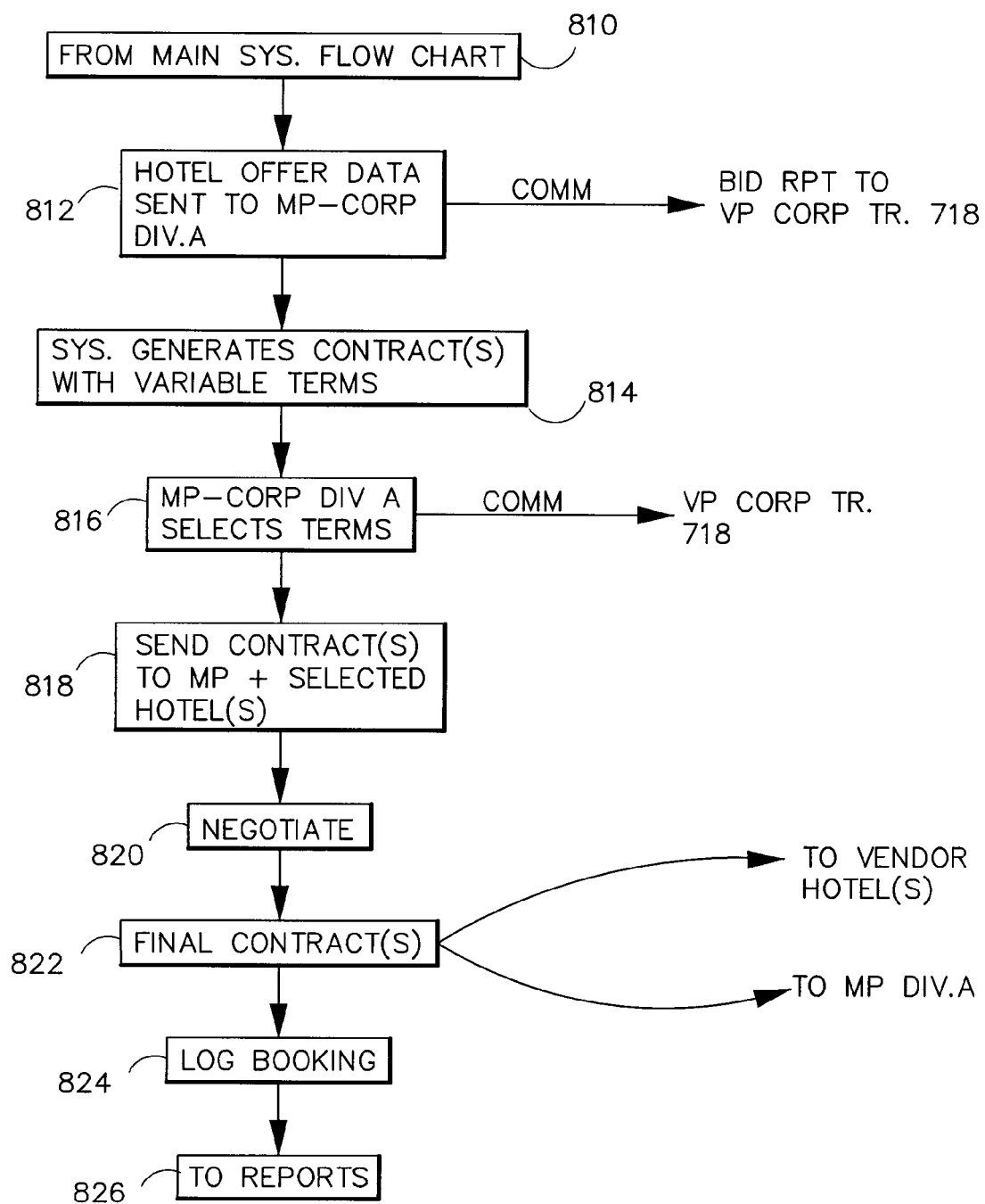

ADAPTIVE MATCHING PROGRAM AND SYSTEM FOR CORPORATE MEETING PLANNERS AND HOSPITALITY PROVIDERS

This is a continuation-in-part patent application based upon and claiming the benefit of application Ser. No. 09/740,371, filed Dec. 19, 2000, now U.S. Pat. 7,343,338. The present invention relates to an adaptive computerized method and a system for matching hospitality providers, such as hotels and hospitality facilities provided by these and other vendors, with the needs or necessities of a plurality of meeting planners which organize and implement corporate, association and third party private meetings and events.

BACKGROUND OF THE INVENTION

Meeting planners (MPs) facilitate and organize corporate meetings, events, and other types of gatherings for businesses, charitable organizations and private parties. There is a continuing need by these meeting planners to locate prospective venues, confirm the amenities, room availability, meeting room availability and other characteristics of the hospitality facility prior to negotiating a price for the meeting or event. From the perspective of the hospitality facility vendor (that is, the hotel, conference center or other type of hospitality facility), there is a need to easily provide basic information regarding the facility and a further need to operate the facility at a high occupancy or utilization rate. Of course, the hospitality facility vendor is seeking the highest possible price for utilization of the facility and the highest occupancy rate, and meeting planners are seeking the lowest possible price for room and board and reasonable quality facilities.

Taking into account the competing and common interests of these parties, there is a need for an information and matching service, implemented as a computer program or a computerized method, which facilitates the postings of offers to sell or provide hospitality facilities and subsequently permit meeting planners to bid on those hotel offerings and a system and method for vendors to bid on meetings and events corresponding to event offers posted by meeting planners. A discussion of some prior art systems follow.

Winsor consultants ("Meeting Auctions" www.meetingauctions.com/) discloses a method for providing and bidding on meeting rooms. Four options are listed. In option one, the user searches the hotel database and completes an Auction/RFP form (request for proposal) stating his requirements regarding hotel rooms. When the submit button is clicked, the form is sent to the Auctioneer who contacts the hotel and sends the user the results. In option two, the user provides more data in the Auction RFP form, such as region, a range of dates, etc. The Auctioneer contacts the hotels with the same effect. In option three, if the user request in the Auction RIP/form, the Auctioneer will contact a large group of hotels to solicit proposals. After discussing a short list with the user, the Auctioneer will work out a satisfactory rate and contract with the selected hotel(s). In option 4, the user fills out the Auction RFP form with the minimum information, and the Auctioneer contacts the user to discuss options.

An article from Business Wire (Oct. 27, 1999) discloses details regarding StarCite.com which provides an auctioning system for meetings and planning particularly with reference to bidding for hotel rooms, and other aspects concerning meetings. The emphasis is on planning, and the essential idea is to develop a large database that contains as much information as possible about hotels including all aspects of meeting, such as old RFPs so that planners can plan and track meetings, amount spent, and have reference to suppliers and specific meeting and travel policies. Planners can search more than 50,000 suppliers. Another site is enventsource.com.

Priceline.com is engaged in a bidding and auction system. The procedure is straight forward and involves booking a hotel room at a favorable rate dictated by the user.

U.S. Pat. No. 5,794,207 to Walker et al discloses a system for allowing prospective buyers of goods and services to communicate a binding purchase offer globally to potential sellers and for sellers to conveniently search for relevant buyer purchase offers. No auction is conducted in the normal sense, and the system is simply an outreach technique that a buyer with limited resources and usage can use to contact many sellers, and thereby, try to purchase at more favorable and competitive terms vis-a-vis large buyers.

U.S. Pat. No. 6,012,045 to Barzilai et al discloses a computer based method of selling consumer products and services. The computer electronically establishes a virtual showroom in which is displayed the consumer products and services, and a plurality of customers are interconnected to the computer via a telecommunication link. The auction is run in the usual way, with consumers bidding for the goods and services. The computer determines the highest and successful bid.

Due to the increased cost of travel, corporations and organizations (a) need to justify the expense of large meetings as well as frequent traveler expenses (e.g., traveling sales representatives), (b) compare the estimated costs of competing hotels, meeting halls, etc.; and (c) reduce or shift the risk of overbooking, cancellation due to weather, labor strikes, etc.

OBJECTS OF THE INVENTION

It is an object of the present invention to provide a computerized bidding method and a system for matching hospitality facility data, provided by vendors, with requirement data representing respective necessities of a plurality of meeting planners for a corresponding plurality of meetings or events.

It is an additional object of the present invention to provide a computer system wherein the roles of the seller (offeror) are reversed with respect to the buyer (bidder) dependent upon a particular desired transaction.

It is a further object of the present invention to provide an information storage and management system which enables the vendor to quickly and easily input or register and confirm hospitality facility data representing their hotels, convention centers and hospitality facilities.

It is a further object of the present invention to provide a simple system for registering meeting planners and for enabling those planners to input requirement data representing necessities of meetings and events such as number of hotel rooms needed, size of meeting rooms needed, special amenities such as golf, tennis etc., geographic location, maximum price, and date.

It is an additional object of the present invention to provide a screening service which initially matches hospitality facility data with requirement data from meeting planners.

It is another object of the present invention to provide a computerized system and a method for posting offers for hospitality facilities or services by vendors, and posting offers by meeting planners to fulfil meeting and event requirements, and a complementary system enabling meeting planners to bid on hospitality facility offers and hotel and hospitality vendors to bid on meeting and event requirements or offers posted by meeting planners.

It is an additional object of the present invention to provide a matching system which displays, to the vendor or meeting planner initiating the offer, all bids, in a blinded format, posted by the prospective complementary contracting party.

It is a further object of the present invention to enable electronic communications between offerors and bidders by providing all bids to the offerors, permitting the offeror to select a predetermined number (typically three), unblinding the selected bid data and offeror data for that predetermined number, and exchanging unblinded data to the selected bidders and the offeror such that the offerors and the bidders can conclude contract negotiations for the hospitality facility without further intervention by the computerized system.

It is another object of the present invention to enable the offeror to select additional bids, other than the initially selected bids, to fulfil the offeror's desires. If a hospitality facility vendor is the offeror, the meeting planner bidders may not be desirable or, for example, not credit worthy. If the offeror is a meeting planner, the facilities bid by vendors may not meet or exceed the meeting planner-offeror's expectations, economic parameters, time for event or other stated or unstated conditions. In such event, the computerized system and method produces and presents an additional group of bidders, which meet the offer data, to the offeror.

It is another object of the present invention to provide an adaptive computerized bidding, matching and information exchange method and a system.

It is a further object of the present invention to provide an adaptive system which alters either the search inquiry or the search results based upon the type of meeting planner (MP) making the inquiry.

It is an additional object of the present invention to provide notice to an MP supervisor (such as a corporate VP of travel) based upon the analysis of either the search inquiry (meeting requirement data inquiry) or the search results.

It is an additional object of the present invention to provide an adaptive system therein the MP supervisor changes the parameters associated with the analysis of either the meeting requirement data (search inquiry) or the resulting search results.

It is a further object of the present invention to provide an adaptive system which limits, modifies or expands the search based upon the class of meeting planners which includes the inquiring meeting planner.

It is a further object of the present invention to provide an adaptive method and system wherein an analysis of the search results or meeting requirement data inquiry is made and a communication is generated to a vendor (hotel) promoter, such as a VP of a flag hotel corporation.

It is a further object of the present invention to provide an adaptive system which includes a based input method (or software program) which changes the analyzer and the search results or the search inquiry based upon certain detected characteristics.

It is another object of the present invention to provide a client based output method (a program module) operative in conjunction with a bidding, matching and information exchange method wherein the vendor promoter operating the client based output module changes the analysis and hence the search results.

SUMMARY OF THE INVENTION

The adaptive computerized bidding method matches hospitality facility data and meeting requirement data with rule-based analysis and potential third party input, permits the posting of offers and responsive bidding by hospitality facility vendors, and facilitates the exchange of data and essentially enables the meeting planner MP to select a competitive hotel or facility vendor or vendors for a particular purpose. The hospitality facility data represents vendors for hotel facilities, meeting room facilities or other hospitality facilities. Meeting requirement data represents the necessities of a plurality of meeting planners for a corresponding plurality of meetings or events. The system and the method stores the hospitality facility data and the meeting requirement data in a database. The hospitality facility data and meeting requirement data at least includes, respectively, vendor contact data, meeting planner contact data, room data, date range data, meeting room data and price data. The system and the method gathers meeting requirement data from a plurality of meeting planners. Typically, this meeting requirement data includes minimum facilities requirement and price data. In an enhanced version, the meeting requirement data also includes location and date availability. The system matches the meeting requirement data with previously stored hospitality facility data. Typically, the data match involves date availability, price, number of rooms required and, sometimes, location. Input from the supervisor for the MP may be required, or alternatively, the MP supervisor may simply be provided with a report. Meeting requirement data is truncated or blinded to obscure or withhold the identity of the meeting planner offeror who supplied the meeting requirement data. The blinded meeting requirement data or offer then is sent to hospitality vendors which match the meeting requirements. Additionally, further input and communication with promoters of the hotel vendors, such as the corporate flag or trademark owner of the hotel vendor, either receives notice of the inclusion of one or more of his/her flag hotels in the resulting search and/or supplies input into the search results by, typically, adding or deleted hotel properties. The hospitality vendors listed in the search results (modified by the third party input), then submit specific hospitality facility data or bids to the system. The system and the method presents to the meeting planner MP, supplying the RFQ (request for quote) unblinded specific hospitality facility data or unblinded hospitality bids. The system and method then permits the meeting planner to select hospitality vendor bids. Upon this selection, the system and the method exchanges contact data and a full detail of the meeting planner offer and a full detail of the selected vendor hospitality bids to both the MP meeting planner and all of the "winning" or selected hospitality vendor bidders. In the event the meeting planner cannot fill his or her necessities (the MP can select or reject a bid in his or her complete discretion), the meeting planner can request that the system and the method to provide another group of hospitality vendor hotels or providers (e.g., meeting halls) while deselecting one or more previously submitted hospitality vendors. The system then again exchanges contact data and full MP and bid data between the selected bidders and the meeting planner.

In one embodiment, the system and the method also enables the hospitality vendor to offer hospitality facilities. Blinded facilities offer data is presented to one or more inquiring meeting planners. Additionally and optionally, blinded facilities offer data is provided to everyone via the Internet. Meeting planners can bid by submitting specific facilities requirement data for those hospitality vendor offers. The meeting planner bids are blinded (to remove bidder name, etc.) and all blinded planner bids are presented to the hospitality vendor offeror. The hospitality vendor offeror is permitted to select a predetermined number (3) of the blinded meeting planner bids (specific requirement data) and, upon selection, the system enables direct communication with the exchange of hotel vendor offeror contact data and winning meeting planner bidder contact data. If the vendor-offeror cannot fulfil the offer (in his or her sole discretion to accept or reject bids), the vendor-offeror requests additional meeting planner bids and deselects other previously supplied meeting planner bids. Thereafter, the system repeats the exchange of data process.

In a simplified system, meeting planner requirement data (at least meeting planner contact data, facilities requirement data, date range data and price data, other data points may be used) is matched to hotel or hospitality vendor data (at least vendor contact data, location data, room quantity data, date available range data, and meeting room data), and the system sends MP requests for proposals (RFQs, MP requirement data) to matching hospitality vendors without disclosing the planner contact data. Thereafter, the hotel vendors respond and the responses are sent to the meeting planner posting the offer. The presentation to the planner may be in spread sheet form, sorted by pre-set criteria.

The implementation of the adaptive filter, generally a rule based analysis, for the initial MP search, prior and post search results, engages the input of a third party designee having some authority over either the MP or the event subject to the MP's efforts. The MP supervisor input enables greater coordination, justification of travel expenses, implementation of budgetary limits at a time early in the planning stages and the better exchange of information between the MP, the MP supervisor (third party designee) and numerous hotel vendors. Specific authorization may also be built into the adaptive system. An output analysis, keyed to the vendor or supplier of the hotel or other hospitality facility, improves the resulting search data, adds hotels/facilities, deletes otherwise available hotels and achieves many of the same benefits as the input analyzer or adaptive filter or modifier. The addition of a vendor communications loop and a vendor input data stream into the process also benefits the entire system, the MPs and the hotel vendors and the system operator.

BRIEF DESCRIPTION OF THE DRAWINGS

Further objects and advantages of the present invention can be found in the detailed description of the preferred embodiments when taken in conjunction with the accompanying drawings in which:

FIGS. 5A and 5B diagrammatically illustrate display screens on client computer systems wherein FIG. 5A shows an interactive displays posted on client computer system enabling a hotel or vendor to review his or her offers and his or her bids and enabling the hotel vendor to post new offers, search for meeting planner offers and update hospitality facilities data and wherein FIG. 5B diagrammatically illustrates a similar display screen for a meeting planner-client computer system;

FIG. 13 diagrammatically illustrates a more detailed flow chart for the enhanced system;

FIG. 14 diagrammatically illustrates a sub-routine for the generation of a contract for the facilities.

DETAILED DESCRIPTION OF THE PREFERRED EMBODIMENTS

The present invention relates to an adaptive computerized bidding method and a system for matching hospitality facility data, provided by vendors, with meeting requirement data, provided by meeting planners and representing respective necessities for a plurality of meetings or events. Throughout the description of the present method and system, abbreviations are sometimes utilized describing certain features. One system is shown in FIGS. 1-10 and an enhanced system is shown in FIGS. 11-14. The following Abbreviations Table lists these items.

| Abbreviations Table | |
| --- | --- |
| # | number |
| Admin | Administrator |
| Auth | Authorize |
| cc | copy correspondence to another designated party |
| comm. | communications (e-mail, electronic response requested, telephone call contact) |
| Commn | commission as in agent commission |
| cpu | central processing unit |
| DB | Database or spread sheet or data array |
| Desig. | Designated, such as a designated party or parties |
| Facil. | Facilities, such as HF hospitality facility vendors e.g. hotels |
| hosp. | hotel, convention center or other hospitality provider |
| I/O | Input-Output device (e.g., I/O for keyboard, modem etc.) |
| indpt | Independent, as in independent MP |
| mem | memory |
| MP | Meeting planner |
| MP-Sys-CSresp | a systems customer representative, assigned to one or more customers of the system operator |

-continued

Abbreviations Table

| | |
|---|---|
| Neg. | Negotiate |
| org. | organization |
| rcd | record or records (rcds) |
| req'd | required |
| RFQ(s) | Request for proposal(s) or an offer from a meeting planner to retain a hotel for a function |
| Rpt. | Report |
| rqmts | requirements |
| rqt | request(s) |
| SA | Sales associate |
| stats | statistics |
| t | time |
| Tel. Comm. Center | Telecommunications Center with voice communications |
| Tel. Comm. Sys. | Telecommunications System |
| Trans. | Transient, such as a traveling salesman or buyer frequently traveling |
| Sch. | Search |
| Supple. | Supplemental, as in, supplemental party or parties |
| Sys. | System |
| VP Corp. Tr. | Vice President (or other supervisory official) of corporate travel for a designated organization |
| yr | year |

Figure 1A:
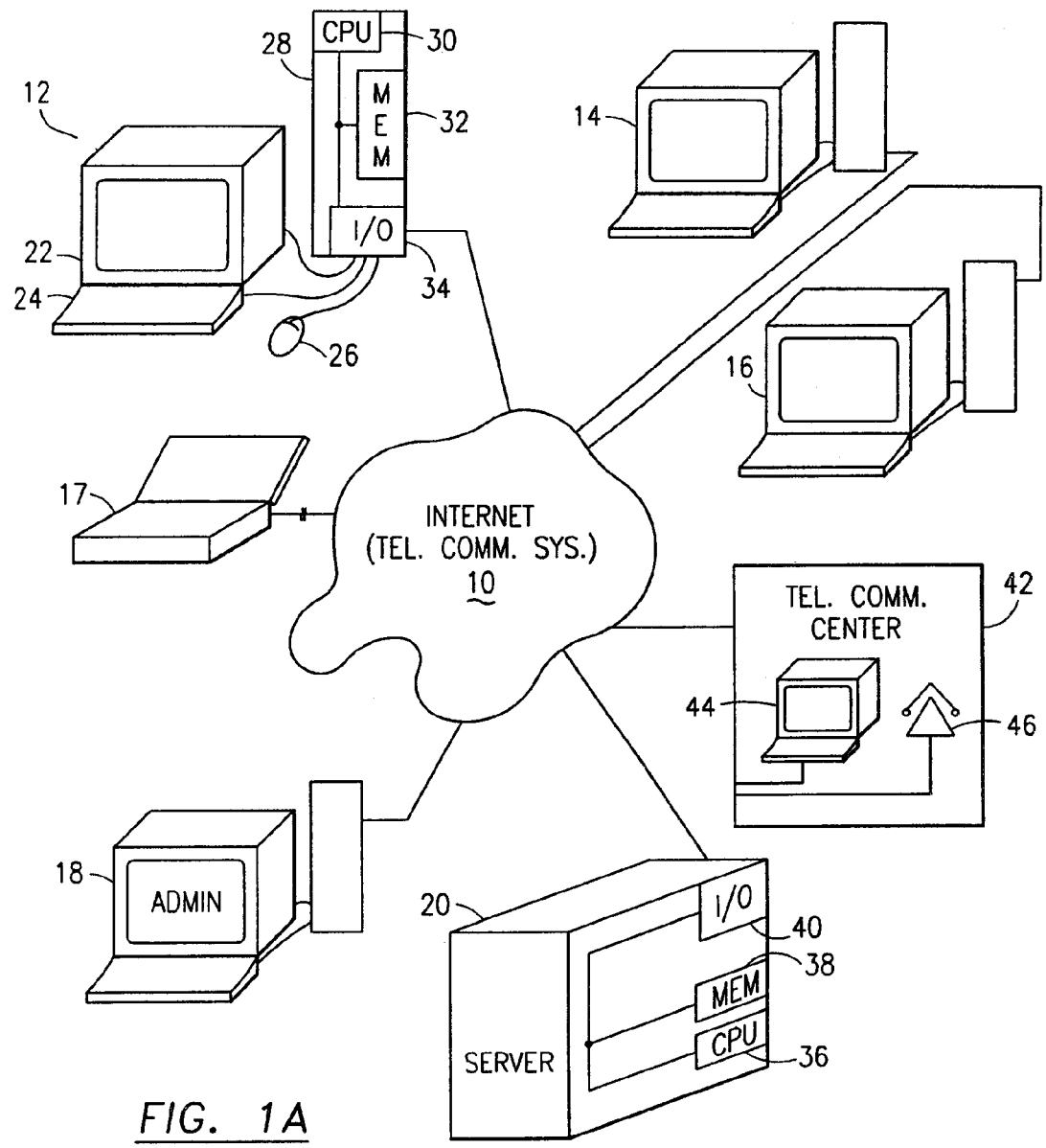
FIG. 1A diagrammatically illustrates a global telecommunications system or Internet and the computerized bidding method and system utilizing at least one computer server and utilizing at least one and typically a plurality of client computer systems engaged in a communications session over the Internet.

FIG. 1A diagrammatically illustrates the global telecommunications system or Internet 10 which enables communication and data transport between a plurality of relatively independent computer systems 12, 14, 16, 17, 18 and 20. Computer system 12 includes monitor 22, input device or keypad 24, input device or mouse 26, and processor unit 28. Processor unit 28 includes a central processing unit or CPU 30, memory 32 and an input/output or I/O device 34. It should be appreciated that memory 32 represents many types of data storage including hard drives, volatile and non-volatile memory, and removable drives. Also, I/O 34 represents a plurality of input/output devices which are utilized to couple items which are peripheral to processing unit 28. I/O 34 is connected to Internet 10. Computer 17 is a laptop computer which can easily be disconnected from Internet 10. Computer 18 is an administrative computer which assists in the overall control and operation of the system and the method described herein. Computers 12, 14, 16 and 17 are client computer systems operated by vendors and meeting planners.

In a preferred embodiment, the system and method are deployed on Internet 10 via computer system server 20. Server 20 includes CPU 36, memory 38 and I/O 40, and is coupled to Internet 10.

In a different embodiment of the present invention, the meeting planner—hotel auction system or processing system or method may be partially or entirely carried out with the use of a telephone communications center 42. The telephone communications center typically includes one or a plurality of computers 44 and one or more telephones 46. Human operators may answer telephone inquiries from a meeting planner or hotel representative seeking information regarding an auction. The input of information can be facilitated by a person at telephone communication center 42. For example, computer 44 could display questions which the operator could audibly present via telephone 46 to a caller. The operator would input into computer 44 the caller's answers and system 44 could generate appropriate responses to complete data entry forms for the system.

In a preferred embodiment, inquiries regarding meeting planners, hotels or auctions are obtained by utilizing a web browser or other type of interface on a user's computer 12 (a client computer) as deployed by server 20. The information obtained by computer 12 is generally stored in server 20. Thereafter, the information is processed by server 20 and the output information representing processed data is delivered to the user via Internet 10, and ultimately to user or client computer 12.

Although the system and method is described generally for use in conjunction with Internet 10, the system and method could be utilized exclusively by a single computer, such as laptop computer 17, operated by a meeting planner or a hotel representative. Laptop 17 could be utilized with a CD-ROM storing a major portion of the data bases necessary to carry out the principles of the present invention. Since the bidding process involves a complementary party, that portion must be interactive over a communications channel. Further, the information processing system could be deployed over a local area network or a wide area network or utilized exclusively in-house by a single company with subsidiaries bidding for a facility, such as a corporate resort.

Figure 1B:
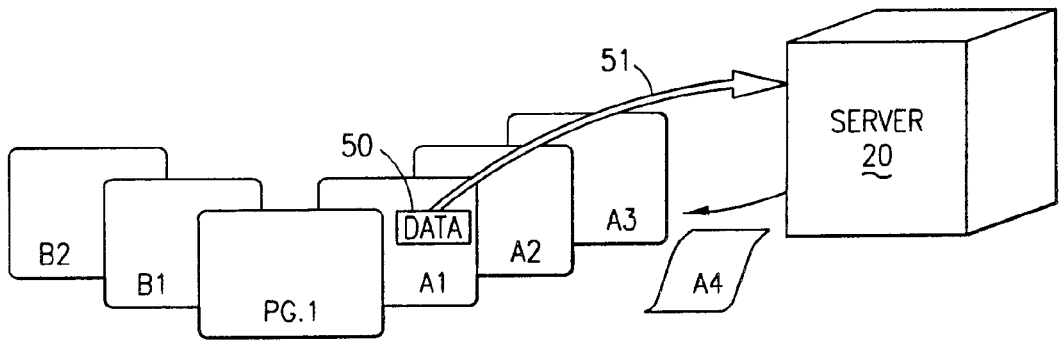
FIG. 1B diagrammatically shows a web based server deploying a plurality of output data packets representative data screens to a client computer system and the return of data from client computer systems.

FIG. 1B diagrammatically shows web-based sever 20 deploying a plurality of screen displays or web pages (page 1, a1, a2, a3 and a4 and b1, b2). Certain data 50, input by a user at client computer 12, is returned to server 20 as shown by double lines 51. In this manner, server 20 transmits information to a web browser on user's computer 12 and that information is displayed to the user. When the user inputs information, that data, such as data 50 in FIG. 1B, is sent back to server 20 to be processed. Output information is provided by server 20 to the user's browser. In this manner, the computer system is a web based server.

The browser is displayed on computer 12 or 17 or on an Internet enabled, computerized device such as a PALM PILOT or Internet enabled cellular telephone. The browser and web server may be considered part of the interface to the data and information processing system.

The present invention could be produced in hardware or software, or in a combination of hardware and software, and these hardware and software implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means (such as a local or widely distributed network over a telecommunications system), as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described herein, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Figure 2:
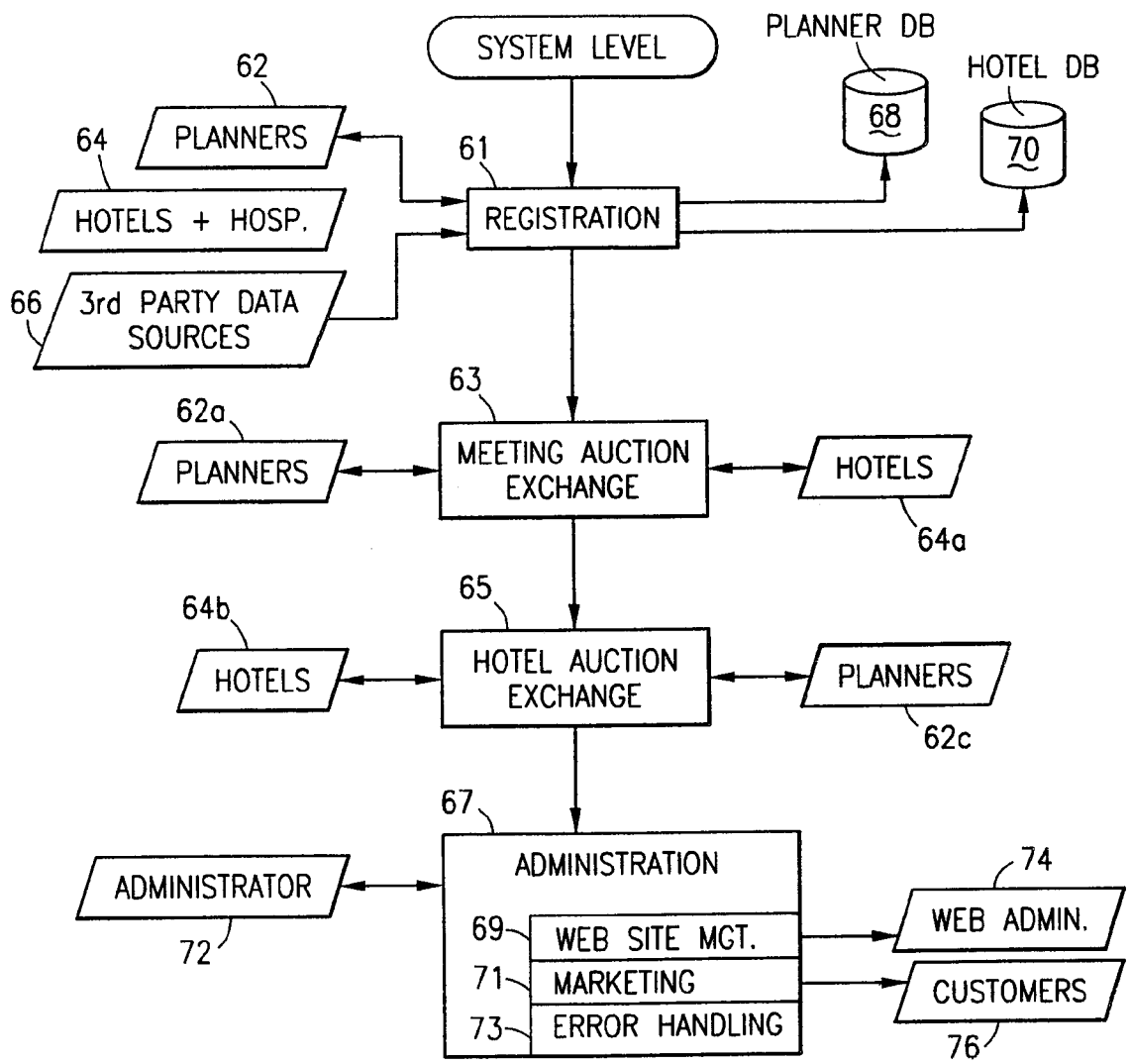
FIG. 2 diagrammatically illustrates the computerized bidding method and system at the system level.

FIG. 2 diagrammatically illustrates a high-level, system diagram for the present computerized bidding method and system. The computerized system includes a registration function 61, a meeting auction or data exchange function 63, a hotel auction or data exchange function 65 and an administration function 67. It should be noted that these functions are not necessarily executed sequentially as illustrated in FIG. 2. The functions may be executed concurrently or in any convenient processing order. The same is true with respect to other routines described herein.

With respect to registration function 61, inputs are obtained from meeting planners 62, vendors representing hotels and hospitality facilities 64 and third parties having facilities data 66. These third party data sources 66 provide basic hotel data such as name, full address and sometimes quality rating or ranking. Registration function 61 processes this information and places or stores the information into a planner database 68 and a hotel database 70. These data bases are typically located on server 20 but may be located on a CD-ROM used by laptop 17. Other databases, lists or indexes may be utilized as discussed later herein. It should be noted that a single database or spreadsheet appropriately divided into meeting planner regions and hotel vendors regions is contemplated by the present inventive system. However, it is convenient to discuss two databases, one associated with the meeting planner information and the second associated with the hotel or hospitality facility vendor information. The discussion of two or more data bases is not meant to limit the claimed invention since a single database, properly organized, may be utilized. In order to reduce the data input time by hotel and hospitality providers or vendors, the system sometimes obtains hospitality facility data from third-party sources. This input of third-party data 66 is recognized in FIG. 2.

Meeting auction or exchange data function 63 obtains offer information from a plurality of planners 62a. Meeting auction exchange function 63 outputs information to hotels and other hospitality facility vendors 64a and planners 62a. Entities 64a and 62a interact the meeting auction function 63 with bids and communications. As used herein, the term "hotel" includes any type of organization or person that furnishes hotel rooms or facilities, motels, rooms, meeting facilities, conference centers, and other hospitality facilities such as golf, tennis, sailing, marina, adventure excursions, tours etc. Accordingly, the present invention is not limited to vendors providing hotel accommodations but is related to a wider range of hospitality vendors. "Hospitality vendor" is synonymous with "hotel vendor" or simply "hotels."

Hotel auction or data exchange function 65 receives offer input from hotel vendors 64b and outputs information or interacts with planners 62c and hotels 64b. These latter entities bid and interact with function 65.

Administration function 67 accepts input from a system administrator 72 and generates output to administrator 72 and website administrator 74 and customers 76 utilizing the system and method. Customers 76 include vendors and meeting planners. Administration function 67 can be further segmented into website management 69, marketing 71 and error handling 73. Error handling 73 may include information or data errors as well as administrative errors. Such administrative errors may include erroneous contact information for particular hotel vendors.

Figure 3A:
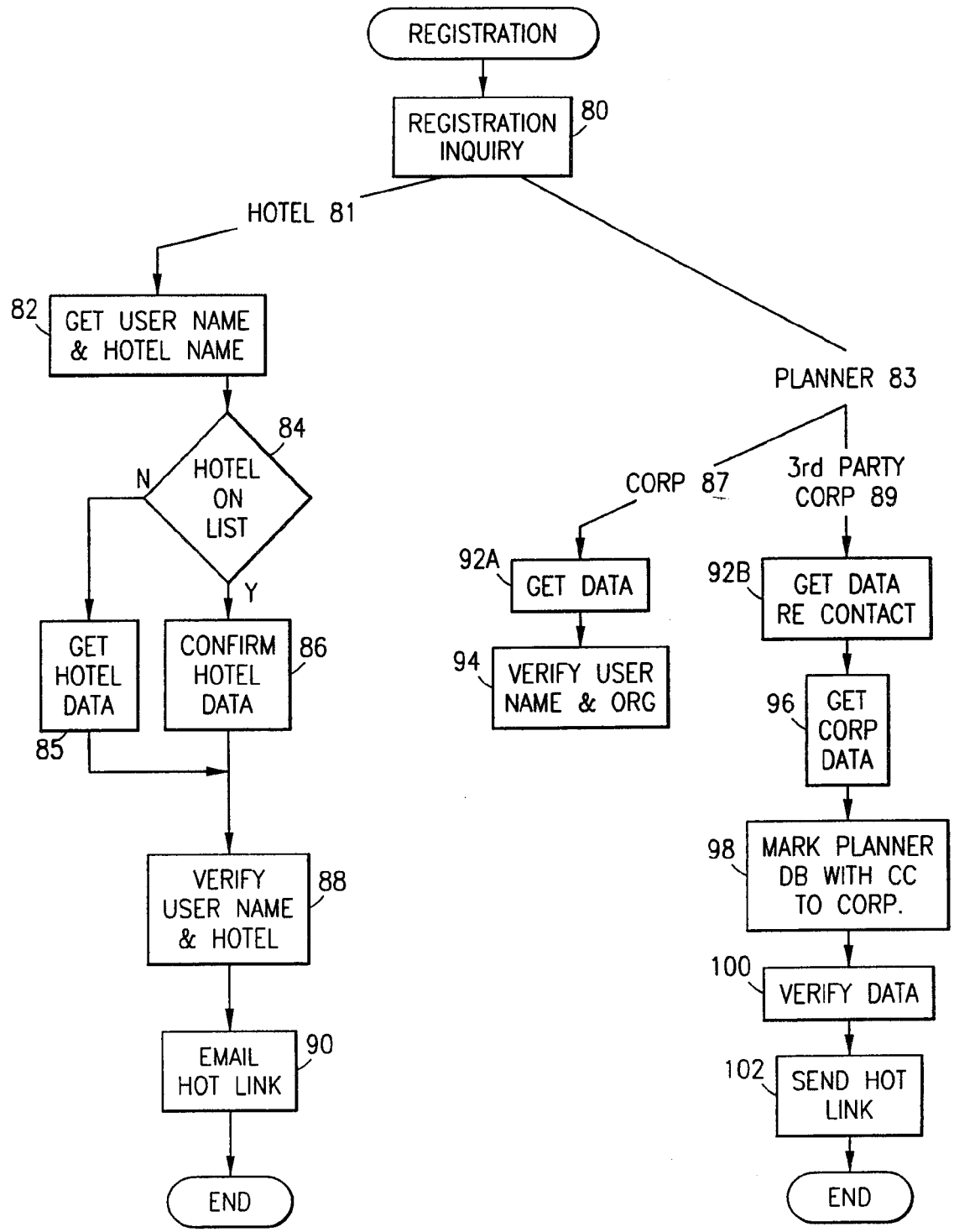
FIG. 3A diagrammatically illustrates a flowchart showing the major components or steps for the registration sub-routine.

FIG. 3A diagrammatically illustrates a registration function. The registration function enables planner 62, hotels and hospitality providers or vendors 64, and third-party data sources 66 to input information into the system. Registration function in FIG. 3A begins with a registration inquiry 80. The registration inquiry branches into a hotel or vendor branch 81 and a meeting planner branch 83.

Vendor branch 81 obtains the user name and hotel name in step 82. If the hotel or hospitality facility is already documented and identified in hotel database 70, according to decision step 84, the YES branch is taken. Step 86 confirms the hotel data with the user-hotel representative typically on the client computer. One of these client's computers includes client computer 12 in FIG. 1A. Alternatively, the system can be implemented with a telephone communications center 42 and a live operator could interact with a vendor via the telephone. The live operator on client computer 44 inputs the information obtained orally from the hotel or hospitality facility vendor.

If the hotel or hospitality facility is not identified and documented in hotel database 72 (FIG. 2) with the action in decision step 84, the NO branch is taken and step 85 obtains hotel and vendor data. Typically, the registran—hotel representative inputs the correct data in step 85 or confirms the data in step 86. The output from steps 85 and 86 lead to step 88 which verifies the user name and the hotel. The verification may be done manually by the system administrator and electronically confirmed. Table 1 which follows provides general data information obtained or confirmed by the hotel representative.

TABLE 1

Registration For Hotel Representative

Personal Information:

Contact Person
Title
Hotel Name
Address (including city, state, country, zip code)
Amenities
Phone Number (direct)
Fax Number (direct)
E-mail (direct)
Website
Industry Associations
Membership Information:

User ID
Password

The present version of the invention includes a verification routine. Step 88 verifies that the user represents the hotel which he or she as indicated in step 82. Typically, the system administrator or staff orally confirms the identity and authority of the hotel's contact person. This is an off-line verification function. An electronic verification (i.e., by automatically, electronically checking the personal records on the website of the vendor or the corporate meeting planner) may be implemented. Table 2 which follows provides an example of hotel registration verification.

TABLE 2

Hotel Registration Verification

System sends e-mail to Registrant.
Post verification - System sends second e-mail with a hot-link to matching service to enable a quick link to matching service web site.

In an enhanced system, the electronic verification program will generate e-mail to the designated e-mail address and then require the recipient's e-mail system to reply to that specific e-mail message. In this manner, the enhanced system electronically verifies that the user is a representative for a particular hotel and is, in fact, associated with that hotel.

Post-verification step 90 sends an e-mail to the user with a URL or hot link. This e-mail enables the user to quickly access the computerized bid-offer system.

Table 3 which follows provides general information regarding the hotel or the hospitality facility listed in hotel database 70 of FIG. 2. This information is also input and/or confirmed by the hotel vendor representative.

TABLE 3

Hotel Information

General Hotel Info

1. Hotel Name
2. Region
3. Type of Facility
4. Closest Airport (may be a pull-down menu)
5. Address
6. City
7. State
8. Zip Code
9. Country
10. Hotel Phone Number
11. Hotel Fax Number
12. Hotel E-mail
13. Website

ROOM INFORMATION

14. # of Rooms
15. Maximum number of rooms utilized for group business

BALLROOM AND BREAKOUT ROOMS INFORMATION

16. Name of the Rooms
17. Largest Room
18. Number of Rooms
19. Dimension of Rooms
20. Technicalities
21. Room Size
22. Square Feet
23. Ceiling
24. Classroom
25. Banquet
26. Conference
27. Theater

AMENITIES

28. Fitness Center (e.g., YES/NO)
29. Business Center (Y/N)
30. Golf on-site
31. Waterfront
32. On the Ocean
33. Tennis
34. Spa
35. Nearby Water Front Sports
36. Nearby Snow Skiing TABLE 3-continued Hotel Information

RATINGS

37. AAA (pull down menu)
38. Mobile (pull down menu)

If the registration inquiry in step 80 branches to meeting planner branch 83, the system further branches or splits into corporate meeting planner branch 87 and third-party corporate representative branch 89. In each one of these branches, obtain data steps 92a and 92b enable the system to gather basic meeting planner data. Table 4 which follows identifies meeting planner categories and definitions.

TABLE 4

Meeting Planner Categories and Definitions

1. Corporate: Work for a company or an association e.g., employee, that does their own meetings and does not utilize third party planner consultants.
2. Third-party Consultant for Corporate: Corporate or association client which utilizes a third-party consultant. Registrant - corporate data must be completed for this type of consultant. Registrant-Corporation will be copied in any information sent to authorized representative. Corporation can only authorize one person to deal on corporation's behalf. Corporation must validate consultant's authority.

The definitions in above Table 4 provide a simple frame work for categorizing various meeting planners. Other frameworks may be utilized. These categories and definitions are not meant to be limiting with respect to the utilization of the present system.

The data obtained in data gathering step 92a may include the registration data for the planner set forth in Table 5 below.

TABLE 5

Registration Table for Corporate Meeting Planner

Personal Information:

Name
Title
Organization Name
Full Address (street, city, state, zip, country)
Direct Phone Number
Organization's main phone number
Direct Fax Number
E-mail
Website
Type of Organization
Type of Industry
Association Memberships
Membership Information:

User ID
Password

The registration table for third-party corporate meeting planners is set forth below in Table 6.

TABLE 6

Registration Table for Third-party for Corporate

[Similar to Registration Table for Corporate Meeting Planner] plus:
    The Site Selection Company
    Registration-Corporation:
        Name
        Organization Name
        Full Address
        Direct Phone Number
        Organization's main phone number
        Direct Fax Number
        E-mail
        Website
Corporate Sponsor Selection and Approval: Corporation authorizes this site selection company consultant to do business on its behalf in the bid-offer system.

Returning to the corporate meeting planner branch 87, after the system obtains basic data (see Table 5), the system in step 94 verifies the user name and the organization. Currently, the system operator confirms this registration and corporate authorization data and an electronic notation is made in the records. Table 7 which follows provides the planner verification steps.

TABLE 7

Planner Verification Table

Registrant gets an e-mail.
System operator verifies authorization.
After verification, system sends e-mail with a hot-link to computer match system.

With respect to the third-party meeting planner branch 89, after the system obtains basic information on the third-party representing a specific corporation, the system obtains corporate data in step 96 for the planner. As listed above in Table 6, the user must be an authorized corporate representative and the corporation must specifically elect and confirm that it is bound by the decisions of the third-party consultant. For a corporation to be bound, an electronic authorization may be utilized. See Table 6, Corporate Selection and Approval. The data obtained in data step 92b relates to basic consultant information and data acquisition step 96 obtains corporate or association data.

Returning to the registration branch 89 for the third-party consultant for a corporation, in step 98, the system marks the corporate planner database with indication that copies be sent to the designated corporation. Step 100 verifies the data obtained in Table 6. This verification is similar to the Planner Verification Table. Step 102 sends a hotlink or hyperlink from the system to the consultant for the corporation.

Figure 3B:
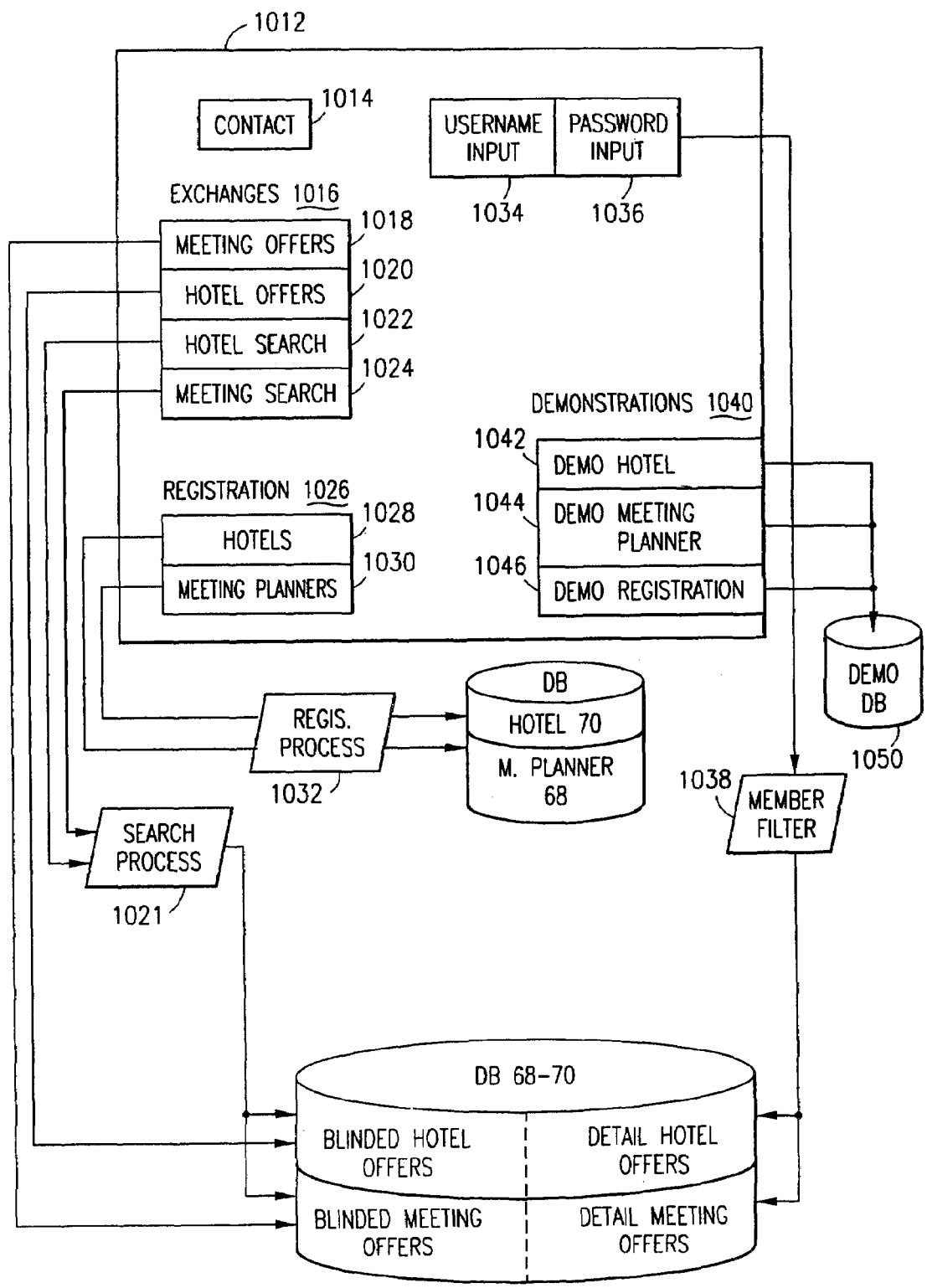
FIG. 3B diagrammatically illustrates a web page and data flow or process diagram for an initial portion of the system and method in accordance with the principles of the present invention.

FIG. 3B diagrammatically illustrates the initial web page generated by the matching computer system, primarily available via the Internet 10 (FIG. 1), and several basic initial processes. Web page 1012 is presented to a registered user (a hotel vendor or a meeting planner) or a visitor at the website. Critical elements in web page 1012 include a contact active button or field 1014. Contact field 1014 enables the visitor or registered user to electronically contact the system administrator. The other critical active areas in web page 1012 include exchange areas 1016, registration area 1026, user name and password active areas 1034, 1036 and demonstration active area 1040. Exchange active area 1016 provides a hot link or hyperlink or active interface for meeting offers 1018 and hotel offers 1020. Activating or "clicking on" planner meeting offer area 1018 or hotel offer area 1020 passes the user or visitor to hotel offer database and meeting offer database 68-70 (via a hyperlink). Particularly, the registered user or the visitor can view blinded or truncated open (unexpired) hotel offers and blinded or truncated meeting offers. Table 7B below list some exemplary data in the truncated meeting offer. Table 7C is the Truncated Hotel Offer Table. Particular details regarding these offers are discussed later.

TABLE 7B

Truncated Meeting Offer Table data record id
offer expiration date
requested dates (to-from-)
# of rooms
location (region, state, airport)
type of hotel
max'm price
details (active tag to file)
bid history (active tag to file)

TABLE 7C

Truncated Hotel Offer Table data record id
offer expiration date
dates available (to-from-)
# of rooms (max'm and min'm)
location (region, state, airport)
type of hotel
size of meeting room
max'm price
details (active tag to file)
bid history (active tag)

Hotel search active area 1022 and meeting search active area 1024 transfers the registered user or visitor to a search process 1021. Search process 1021 enables the registered user or the visitor to search for and review the data shown in the blinded or truncated hotel offer or blinded or truncated meeting offer database. In other words, the registered user or visitor may wish to look at all hotels in the State of Florida rather than all hotels in the U.S. Search criteria based on dates availability, location, type of hotel and price are common search criteria.

Registration areas 1026 include hotel active area 1028 and meeting planner active area 1030. The registration areas 1026 transfer the visitor or potential user to a registration process 1032. Registration process 1032 is discussed above generally in connection with FIG. 3A. The output of registration process 1032 enables changes to be made to the database, that is, hotel database 70 and meeting planner database 68 (sometimes referred to herein as database 68-70).

Figure 5A:
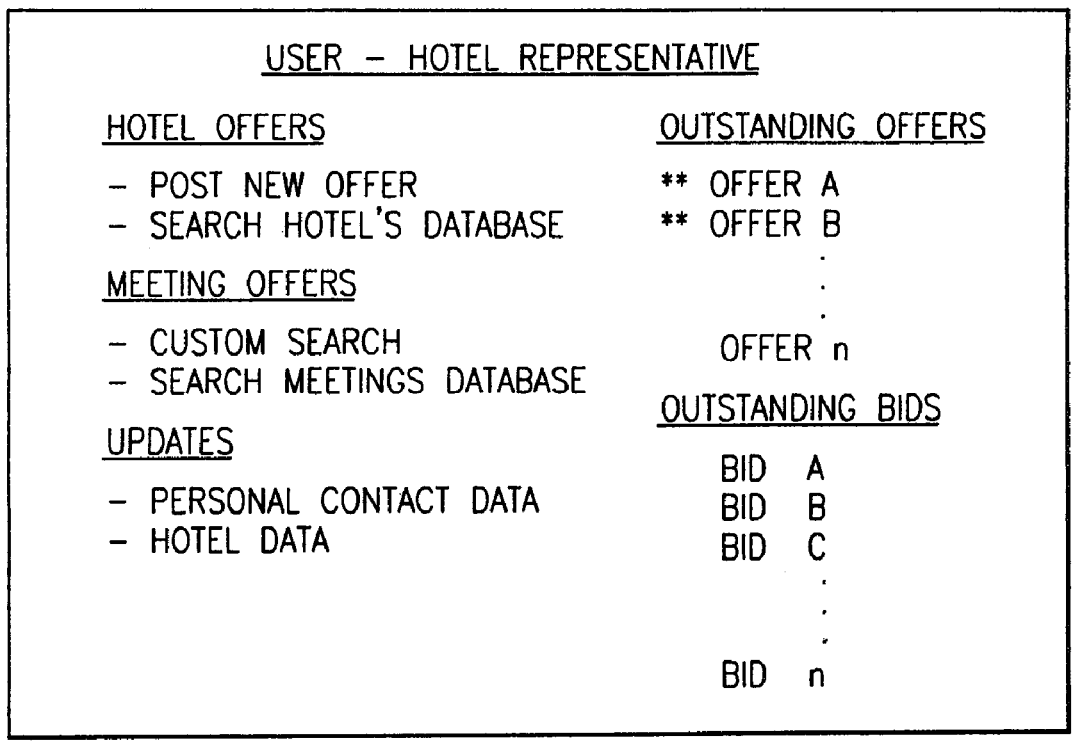
Figure 5B:
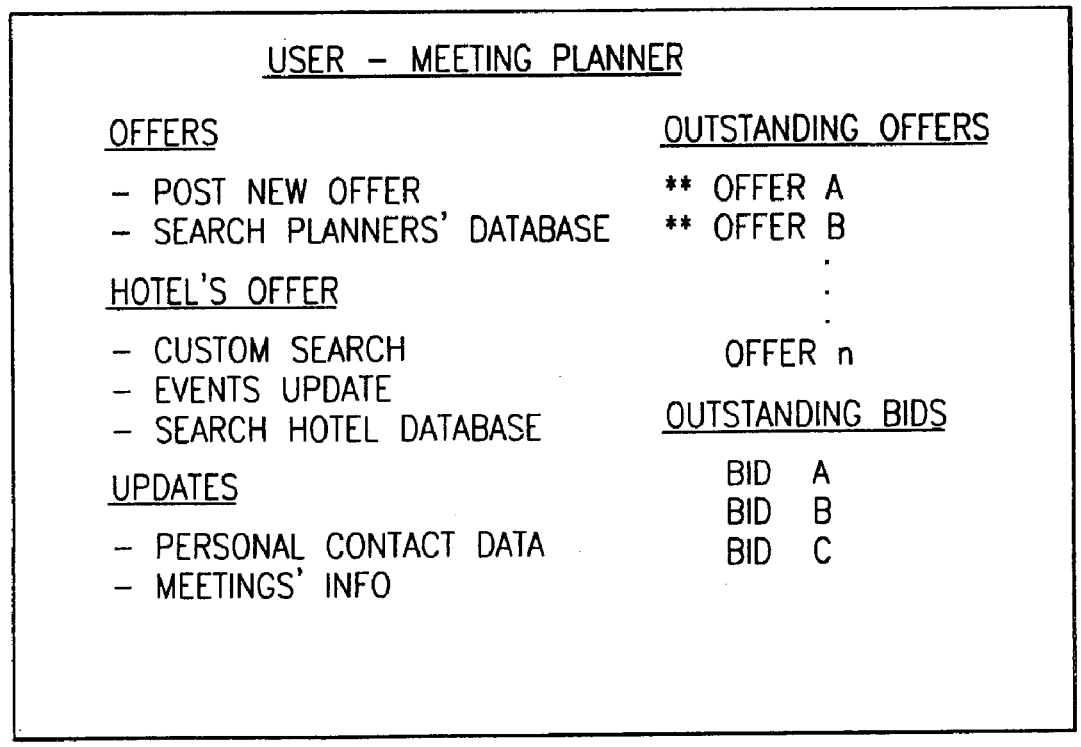

A registered user can input his or her name in user name input active area 1034 and insert his or her appropriate password at password input area 1036. The user is then transferred to a functional routine identified herein as member filter function 1038. The user is then presented with his or her specific activities page. An example of a hotel activity page is shown in FIG. 5A. An example of a meeting planner activity page is shown in FIG. 5B. The function "member filter" described in connection with FIG. 3B is simply a recognition that only certain information is presented to the activities page for the hotel representative or the meeting planner. For example, open offers and bids posted by the registered member are (a) located in the database by the filter and (b) displayed in an orderly manner to the registered user. Programmers may use a fetch command rather than a filter routine.

In order to enhance the user friendliness of the system, a demonstration active area 1040 is provided. Demonstration area 1040 includes demonstration for hotel offers and bids 1042 and a demonstration for meeting planner offers and bids 1044. A demonstration for the registration function may also be provided in active area 1046. The users, upon actuation of active areas 1042, 1044 or 1046 are transferred via hyperlink to a demonstration database 1050. Of course, demonstration database 1050 could be part of hotel database 70 and meeting planner database 68 (which may be a single database as described earlier) or may be a separate database in order to avoid corruption of accurate data with respect to the hotels, meeting planners, posted offers and posted bids (offer-bid database 68-70).

Figure 4:
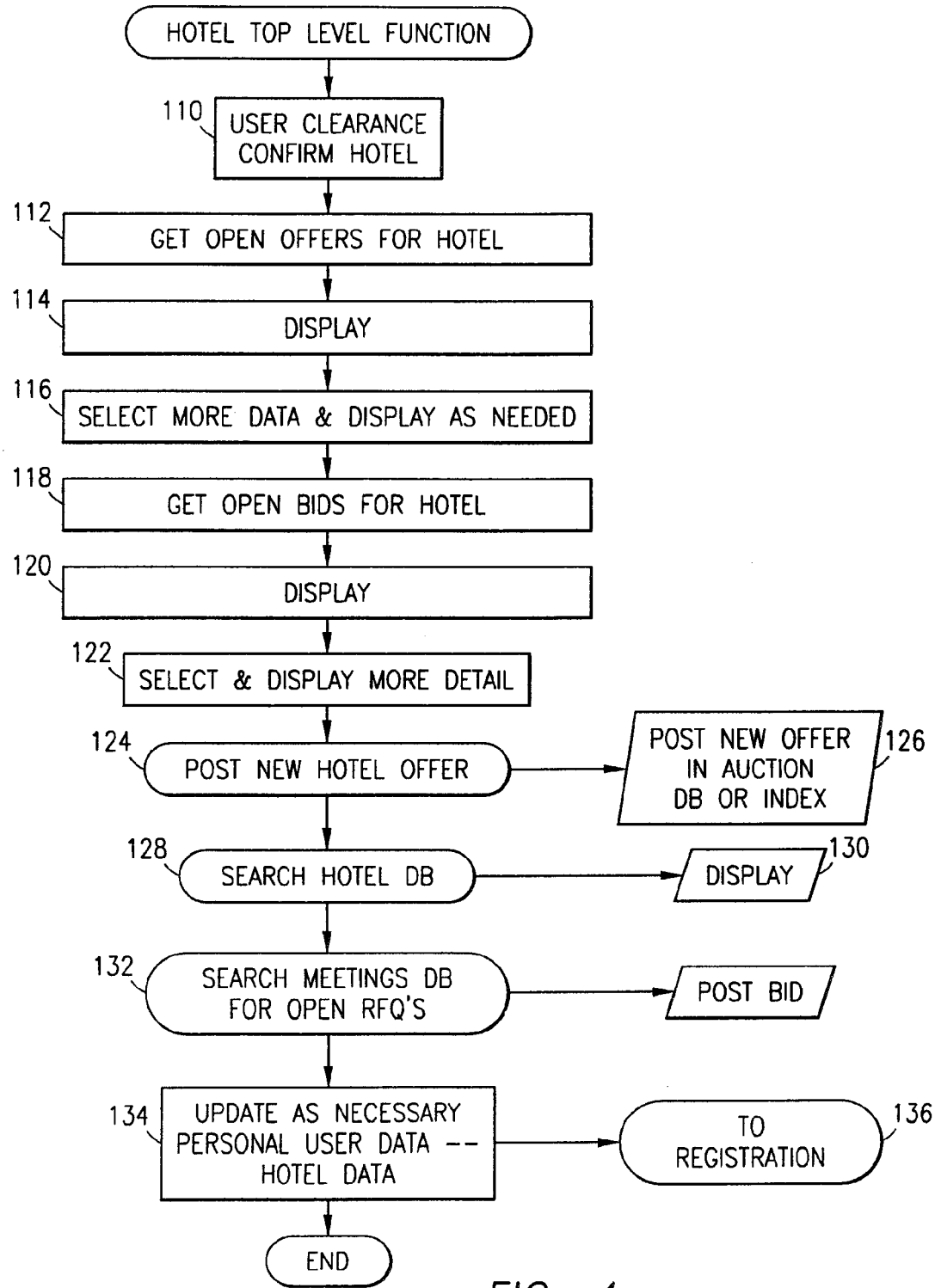
FIG. 4 diagrammatically illustrates a top level hotel functional flowchart.

FIG. 4 diagrammatically illustrates the top level hotel function routine for the present system. It should be noted that each function is activated by the registered user by selecting an active field on the web display page. Hence, the sequence or process is not linear as shown in FIG. 4 but is typically user selected. Step 110 obtains user-hotel information from one of the plurality of client computer systems and confirms that the user is associated with the hotel. Common log-in and security clearance programs are utilized by the present system.

In step 112, the system obtains "open," that is not expired, offer data and responsive bid data for that hotel or hospitality facility vendor from the database. Step 114 displays those open offers wherein the hotel or hospitality facility vendor is offering to provide hospitality services to registered meeting planners. Step 116 enables the user to select more data (show details and show bid history) to view outstanding offers and display posted by the user. Offers and bids not posted by the user are blinded or truncated data compilations. Bid data can be changed via this step unless the auction has expired. Step 118 obtains any open bids made by the hotel vendors for events and meeting offers posted by meeting planners. Step 120 displays those bids. Step 122 enables the user to select and display more details regarding those bids. See Tables 10 and 11 below.

FIG. 5A generally shows an exemplary display screen for a hotel as accessed by a hotel registered user. Outstanding facilities (e.g. hotel) offers to provide hospitality facilities are shown in the right column as are outstanding bids. In FIG. 5A, the asterisks next to Offer B indicates that the offer is outstanding and the bid time has not expired (i.e., open). After expiration of the bid period but during the selection of successful bidders, an additional function may be added to the system to enable a bidder (whether a hotel or a planner) to withdraw his or her bid. A withdrawn bid is not available for later selection by the offeror. On the left side, the registered hotel user is enabled to post new hotel offers, search the hotel database 70 (FIG. 2), search for meeting planner offers either through a customized search or a global search and is enabled to update information regarding hotel and personal contact data. A custom search is an automated search matching facilities data with any outstanding meeting planner bids. First, the registered hotel user is presented with open offers and posted bids to sell his or her facility. Supplemental data is available by activating details or bid history active areas.

Returning to FIG. 4, after the step of selecting and displaying more detail in step 122 (see Table 16), the system executes function 124 which enables the registered user to post new hotel offers. The post new hotel offer routine is discussed in detail in the hotel auction or exchange data offer routine in FIG. 7A. In that figure, hotels and hospitality vendors input facilities offer data as step 125. Table 9 which follows shows typical information posted by hotels offering hospitality services or facilities. Of course, other types of vendors could offer other hospitality services rather than hotel services. An appropriate vendor posting page may be configured for specialized hospitality vendors (e.g., golf courses, marinas, etc.).

TABLE 9

Offer Posting Page for Hotels

Offer Information:
Dates Available From __ to __ (required)
Min# of Rooms (req'd)
Max # Rooms (req'd)
Max Price (req'd)
Largest Meeting Room Available (req'd)
Auction Time Frame (req'd)
  Select 5 day, 10 day or 15 day open bid period for this auction In FIG. 7A as an example, the system in step 127 posts the offer regarding a proposal to provide hotel rooms in hotel database 70 of FIG. 2. This data is sometimes called facilities offer data. Step 129 sets the auction time frame. These time frames can be changed by the system operator. As shown in Table 9, the auction time frame may be a 5-day, 10 day or 15 day auction. Other time frames may be utilized. In step 131, the system updates the hotel offer database. The outstanding offers are viewable by (a) the authorized hotel representative in the outstanding offer category shown in FIG. 5A; (b) the registered meeting planner via the search active area "Hotel Offer" in FIG. 5B and (c) the visitor via hotel offer active area 1020 in FIG. 3B.

An example of outstanding offer data is shown below in Table 10.

TABLE 10

Outstanding Hotel Offer Table

Expiration Date/Dates Available/Max# of Rooms/Min# of Rooms/State/Closest
Airport/Type of Hotel/Largest Meeting Room Available/Price/Details/Bid History Outstanding bids posted by the hotel and shown in the display field of FIG. 5A unique to the registered user are listed as shown below in Table 11. Bids by hotels are sometimes called specific hospitality facility data.

TABLE 11

Outstanding Bid Table

Expiration Date/Dates Available/Max# of Rooms/Min# of Rooms/State/Type of
Hotel/Largest Meeting Room Available/Price Table 11 also shows blinded or truncated facilities offer data made available to a meeting planner who has posted an offer for an event as "requirement data." The term "requirement data" is utilized because the meeting planner "needs" or "requires" that facility or service (e.g. compare a "need" for a golf course to a "need" for a 2000 person meeting room) to prepare, launch and execute a successful meeting. The blinded data is in a summary format and does not show identity or contact data of the posting party.

Returning to FIG. 4, the post new hotel offer routine 124 provides an output which posts the new offer in the auction database in step 126. It should be noted that a third database may be implemented or an index may be provided for the offers and resulting bids or planner database 68 and hotel database 70 may be modified to include fields for open offers and open bids relative to the hospitality facilities and meeting planner events and meetings. The index links active offers and bids in database fields.

After the post new offer step 124, the system executes search hotel database step 128. It should be again noted that these functions 116, 122, 124, 128, 132 and 134 are selected by the registered user via an active field on a web page. Therefore, the process flow (e.g., 122-124-128 etc.) is not linear but is dynamically selected (or not selected ) by the user. The output of that search is provided as display 130. The registered hotel user is currently permitted to search the entire hotel database to view all hotel specifics (but not data identifying the bidder's name on bids or the offeror's name of offers). The same is true for visitors. See Table 12 below for the search routine fields which define the inquiry format. An asterisk in these tables generally refers to a pull-down menu selection for the client computer or user. The pull down menu * is optional. After the search hotel database routine step 128, the system executes a search meetings database step 132 to locate open requests for quotes (RFQs) or request for proposals (RFPs), that is, open meeting planner offers. Table 12 which follows provides some search criteria. The search criteria can be utilized for a hotel or a meeting auction, or a hotel auction. It should be noted that the "auction" is primarily promoted by the easy exchange of data and the matching of offers and bids wherein each party in the system may be both an offeror (a seller) and a bidder (a buyer). This dual role of both the hotel and the meeting planner is unique to the present system. A hotel vendor may want to search the hotel database to look for outstanding blinded offers. An open offer, even if blinded, affects competition. Since blinded or truncated data is available to all (truncated data represents data without naming the offeror or bidder, see Tables 8A, 8B), price and facility competition is fostered without specifically identifying the offeror. Sophisticated competitors may be able to "guess" who is offering or bidding due to certain unique attributes (e.g., a marina) in a location (e.g., Orlando, Fla.) but the offers and bids are considered anonymous in nature. Since only registered vendors (e.g. hotels) and registered planners are permitted to offer and place bids, the data is genuine and represents high quality information.

TABLE 12

Search Criteria Table

* State
Price (program searches a range)
Arrival Date
Departure Date
# of rooms (* range)
Capacity of largest room requested
Type of Hotel
Required Composite Rating (AAA, Mobil)
Maximum Hotel Capacity
Amenities After the search meetings routine 132, the system executes step 134 which updates database information as necessary. If hotel data must be updated, update step 134 jumps to the registration routine as noted in jump step 136. This jump step transfers operation of the program to registration functional routine shown in FIG. 3A.

Figure 6:
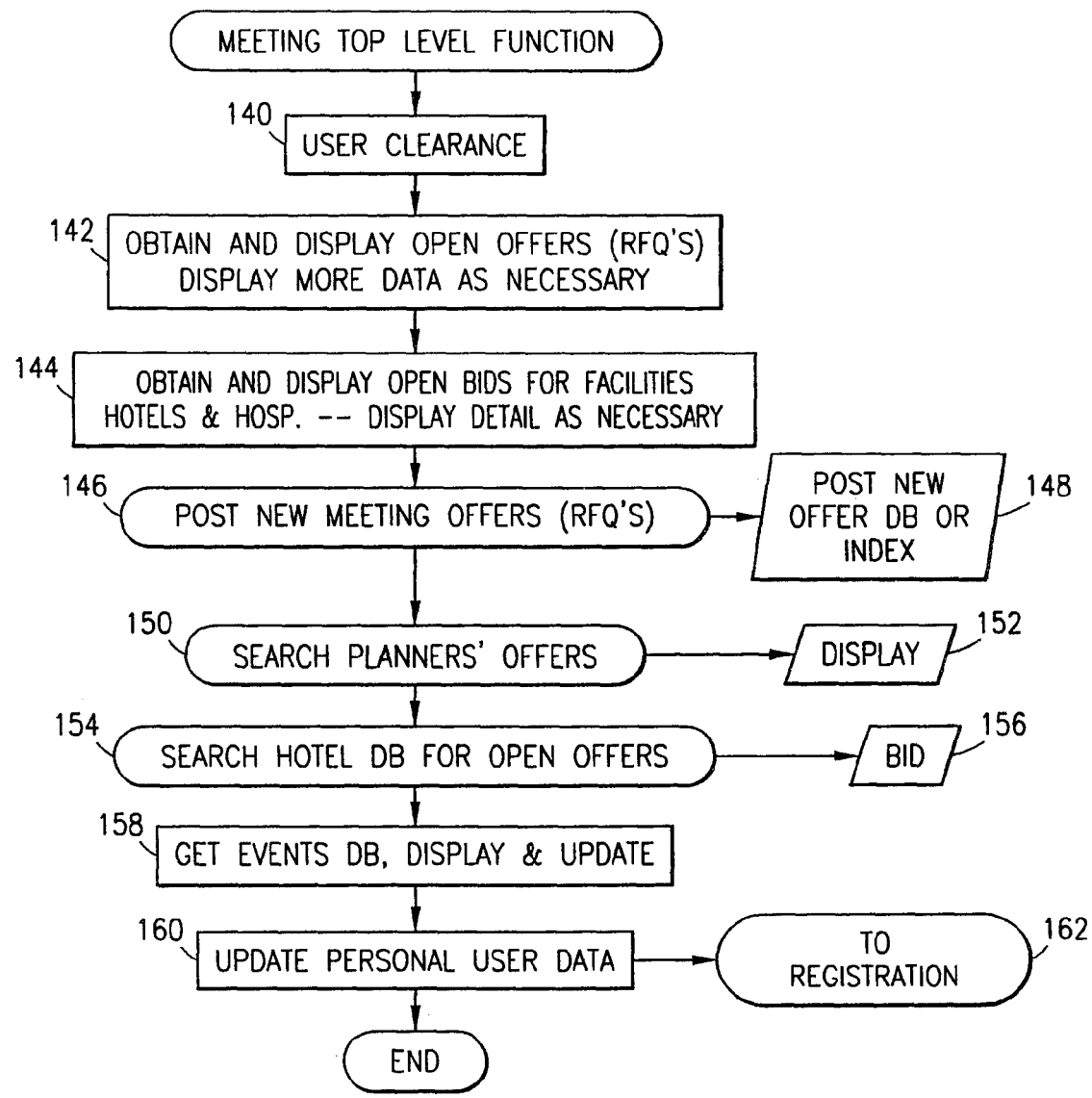
FIG. 6 diagrammatically illustrates a top level meeting planner functional routine.

FIG. 6 diagrammatically illustrates a top level meeting planner function program. Again, the registered user selects, at his option, steps 146, 150, 154, 158 or 160. The linear presentation of the process in FIG. 6 is simply an organized presentation of the functionality of the program. The actual program does not operate sequentially. The user selects the particular functional routine. Step 140 requires a valid user identification and the appropriate password in order to utilize the present system. This id is input from the client's computer system. Step 142 obtains and displays open offers or requests for proposals and displays more data as selected by the user (show "details"). Step 144 obtains and displays open bids made by meeting planners for facilities. The user-meeting planner can display additional details as necessary. These items are found in the user meeting planner web page display shown in FIG. 5B. Outstanding offers and outstanding bids are shown in FIG. 5B on the right hand side. On the left hand side, the user is enabled to post new offers, search for other meeting planner offers (truncated or blinded data is shown in response to these requests), and may search for outstanding hotel offers with a global search. The planner is also enabled to search the general information hotel database and update his or her contact information and meeting planner data.

Returning to FIG. 6, step 146 is a sub-routine enabling the meeting planner to post new meeting offers or request for quotes (RFQs) or request for proposals (RFPs). These planner offers are sometimes called requirement data. The output is a posting of the new meeting offer in the database or index as noted by post new offer step 148. Table 13 shows a meeting planner offer. Optionally, the meeting planner offer input data web page may match the hotel offer input data web page. See Table 9. Another option is the data shown at Table 8A including offer details.

TABLE 13

Offer Posting Table for Meeting Planners

Dates
Specific #Dates
or
Range     (From... To...)
If Range:
  (1) preferred arrival
  (2) # of nights
Geographic Region: (Select 1)
(1) *Region (* indicates pull down menu)
(2) *State
(3) *Closest Airport
*Type of Hotel
*Price
Size of Largest Meeting Room (# of people)
  Required Amenities     (radio buttons (list))
  *Rating
Max Size of Desired Property (range *)
Select Auction Time Frame 5-10-15 days The offeror should identify at least one location setting (a region, a state or a city or airport).

The system in FIG. 6 then executes step 150 which searches other planners' offers. The system displays truncated offer data in step 152. The system then executes search hotel database step 154 to enable the meeting planner to locate new offers posted by hospitality facility vendors. See Table 12. This function may also be used to generally search the entire hotel database notwithstanding the presence or absence of an open offer. The output of the hotel offer search in step 156 may be the posting of a bid by the meeting planner for a particular hospitality vendor offer. Optionally, the planner may decline to post a bid to a facilities offer. The bid posting data is shown below in Table 14. When posting a bid, the system initially and automatically checks to determine whether the bid matches the outstanding offer criteria. The automatic check of bid data against outstanding offers is conducted for each posting of a bid. If an error is detected, the user is given an opportunity to correct the erroneous bid data in the detected field. The bidder (whether a hotel or a planner) is enabled to edit the bid during the "open offer" period (prior to expiration).

TABLE 14

Outstanding Hotel Offer Table

Expiration Date/Dates Available/Max# of Rooms/Min# of Rooms/State/Closest
Airport/Type of Hotel/Largest Meeting Room Available/Price/Details/Bid History
Edit Bid Step 158 obtains upcoming events from an event database (which may be supplemental to planner database 68 and hotel database 70), and enables the meeting to display and update that event database. The event database is described in greater detail in FIG. 10. Step 160 enables the user to update personal data. Jump step 62 transfers the user to the registration routine shown in FIG. 3.

Figure 7A:
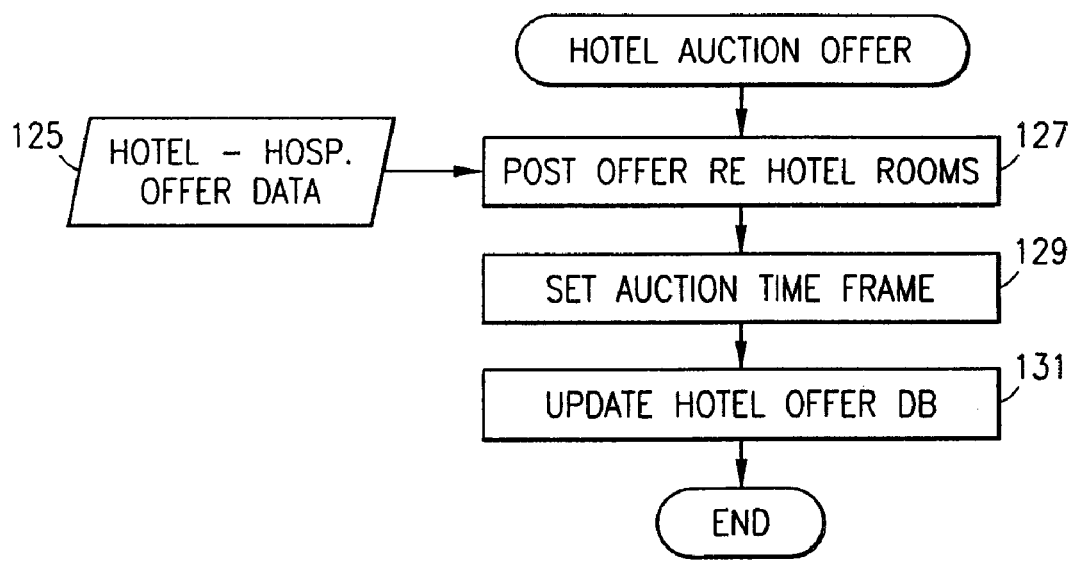
FIGS. 7A and 7B diagrammatically illustrate hotel auction offer routines and meeting auction offer routines.
Figure 7B:
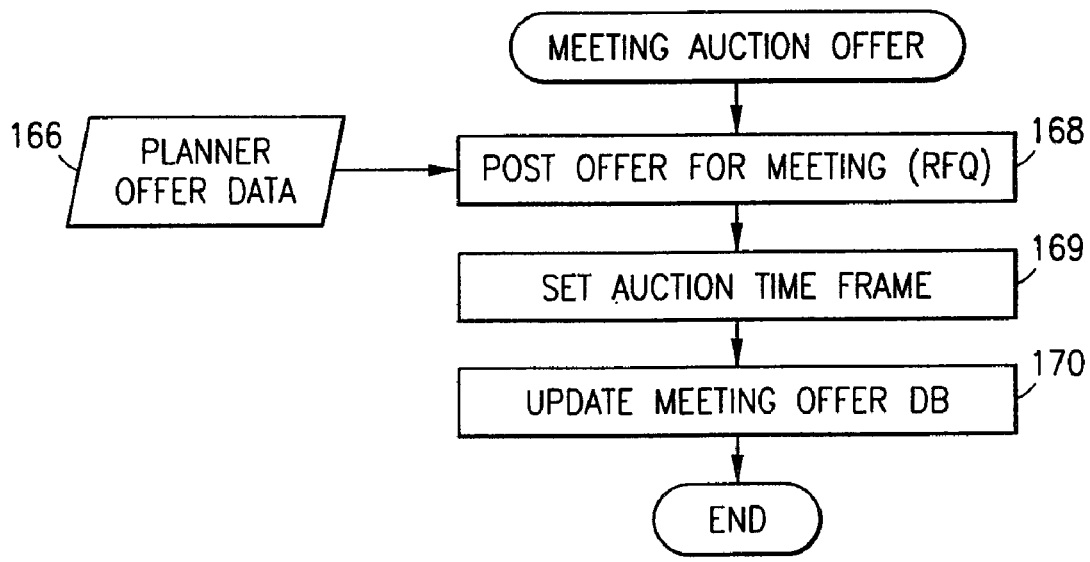

FIG. 7B shows the sub-routine for meeting auction offer. This corresponds to post new meeting offer routine 146 in FIG. 6. Input step 166 enables the meeting planner to input meeting offer data (i.e., requirement data having at least minimum facilities requirements and price data) into the system. The system in step 168, posts a blinded version of that meeting offer data as a request for quote. Blinded data does not include an identification of the offeror or bidder. This data may also be a summary of the larger offer or bid data record. In the Tables, the term "details" enables an authorized inquiring party to view the entire bid. The "authorized party" is the entity which posted the data. The detailed data view is blinded with respect to the seller or buyer contact data and specific location data unless the viewer is the offeror or the bidding party. Step 169 sets the auction time frame for that meeting auction. Step 170 updates the meeting offer database.

The offer postings for meeting planners (sometimes called requirement data) typically include the following data; however, a smaller or minimal data set may be used by the system for this function or for any other data presentation function herein:

TABLE 15

Offer Posting Table for Meeting Planners

Dates
Specific #Dates
or
Range    (From... To...)
If Range:
  (1) preferred arrival
  (2) # of nights
Geographic Region: (Select 1)
(1) *Region (* indicates pull down menu)
(2) *State
(3) *Closest Airport
*Type of Hotel
*Price
Size of Largest Meeting Room (# of people)
  Required Amenities    (radio buttons (list))
  *Rating
Max Size of Desired Property (range *)
Select Auction Time Frame 5-10-15 days This bid data by hotels responding to a posted planner offer is sometimes called specific hospitality data. A smaller offer data set may be used.

Figure 8A:
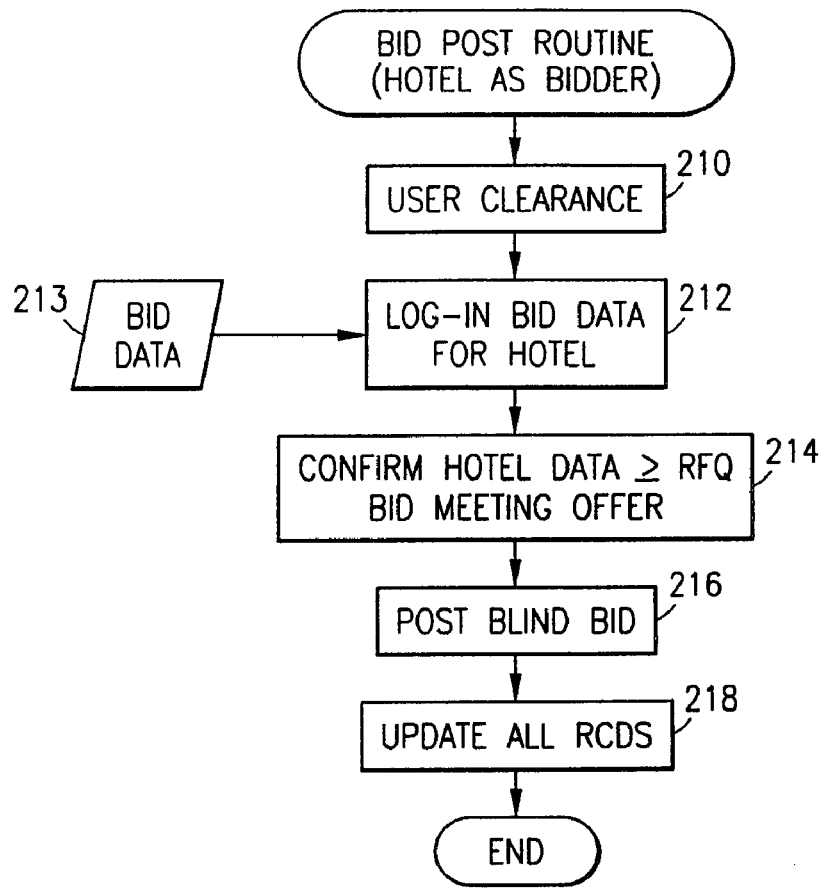
FIGS. 8A and 8B diagrammatically illustrate bid post routines for hotel vendors and meeting planners, respectively.
Figure 8B:
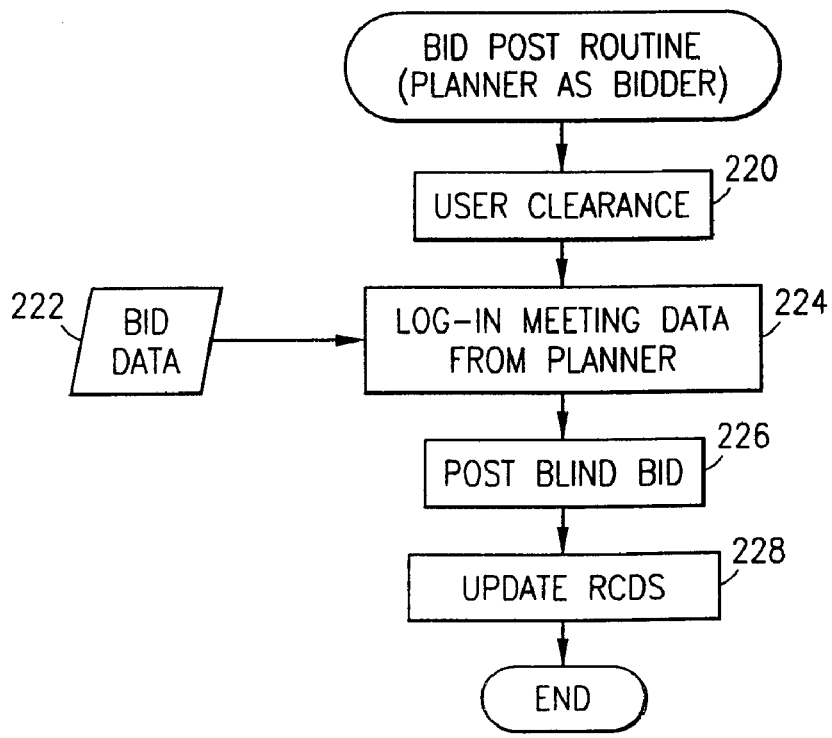

FIGS. 8A and 8B diagrammatically show bid posting routines for the hotel vendor and the meeting planner, respectively. Step 210 is a password clearance step. See also step 110, FIG. 4. Step 212 logs in the bid data (specific hospitality facility data) for the hotel. The input by the user is input step 213. Step 214 confirms that the hotel data meets or exceeds the request for quote or offer from the meeting planner (requirement data). This is an initial match or confirm step. The information input into the system by the hotel vendor or user is shown below in Table 16. A smaller data set may be utilized.

TABLE 16

Bidding Page for Hotel (Hotel as Bidder)

Auction Expiration Date (supplied by System)
Date Available From __ To __ (required)
Min # of Rooms (limit supplied by user; if no data input, system supplies data from general hotel database) (auto check-optional)
Max # of Rooms (limit user inputs; if not, system supplies)
Region (system supplies)
State (system supplies)
Closest Airport (system supplies)
Type of Hotel (system supplies)
Max Size of Largest Meeting Room (system supplies)
Max Price (req'd input)
Details/Bid (control buttons to other routines)

Step 216 posts the full bid data (access permitted only by the bidder) and truncated or blind bid data in the auction-exchange database 68-70. As used herein, a "blind bid" or "blinded data" does not include bidder identity data. Offeror data may also be "blinded data" if the offeror's identity is temporarily hidden. This use of blinded data reduces harassment of the offeror or bidder. Step 218 updates all records as necessary.

With respect to FIG. 8B, the post bid routine when the planner is the bidder, the system executes step 220 which requires that the meeting planner have the appropriate clearance. See also step 140, FIG. 6. Data input step 222 obtains bid data from the meeting planner. This bid data may include information set forth below in Table 17. Other data sets may be utilized. Step 224 logs in the meeting data bid into the system database 68-70 from the meeting planner. Step 226 posts blinded bid data in the appropriate database or as an index entry. Step 228 updates the records as necessary. When a meeting planner desires to bid on an open hospitality facility, the meeting planner posts bid data via a client computer in accordance with Table 17, the Bidding Page for Meeting Planner. At the time the bid profile data is posted, the system automatically checks to determine if the bid meets or exceeds the hotel offer. The user is permitted to revise the bid to meet the offer.

TABLE 17

Bidding Page or Data for Meeting Planner

Auction Expiration Date (Supplied by System)
Requested Dates From __ To __ (req'd)
# of Rooms (req'd)
Region (system supplied)
State (system supplied if available)
Closest Airport (system supplied if available)
Type of Hotel (system supplied)
Max Room Price (req'd)
Details/Bid (control buttons to other routines)

In the event a third-party meeting planner representing a corporation or other entity wants to post an offer or a bid for an event or meeting, that consultant prepares and inputs data shown below in Table 18. This input is used in conjunction with the process described in connection with FIG. 6.

TABLE 18

Supplemental Offer Posting Table for Consultants

Client Link (drop down menu)   Client/Contact/Meeting Name
Name of Meeting
(similar to Offer Posting - Meeting Planners)

The following Search Detail Table can be executed by the hotel vendor-user or the meeting planner-user. See FIG. 4, steps 128, 132 and FIG. 6, steps 150, 154.

TABLE 19

Search Detail Table

1. Dates Available (Search criteria: No specific search field data is required. With respect to dates, the following is required: If user chooses First Date field, the search should be from that point forward. If user chooses the Last Date, the search goes from that point back)
    First Date
    Last Date
2. Number of Rooms (Range: Search n rooms +/− m range)
3. Location (all locations are searchable and any record should be displayed as part of the summary)
    State
    Region
    Closest Major Airport
4. Type of Hotel
    Any
    Resort
    Suburban
    Airport
    Downtown
    Conference Area
5. Price (less than that)
    min. price to pay
6. Meeting Room (largest room available in square footage). They are radio buttons where user can click and pick one selection.
    Classification:
        Square Footage
        Classrooms
        Auditoriums
        Reception
        Banquet
7. Amenities
    List of amenities with radio buttons
8. Ratings
    Mobil
    AAA
    Composite
9. Hotel's Capacity (radio buttons)
    XS < 100
    S > 100-250
    M [250-500]
    L [501-1000]
    XL > 1000

Figure 9:
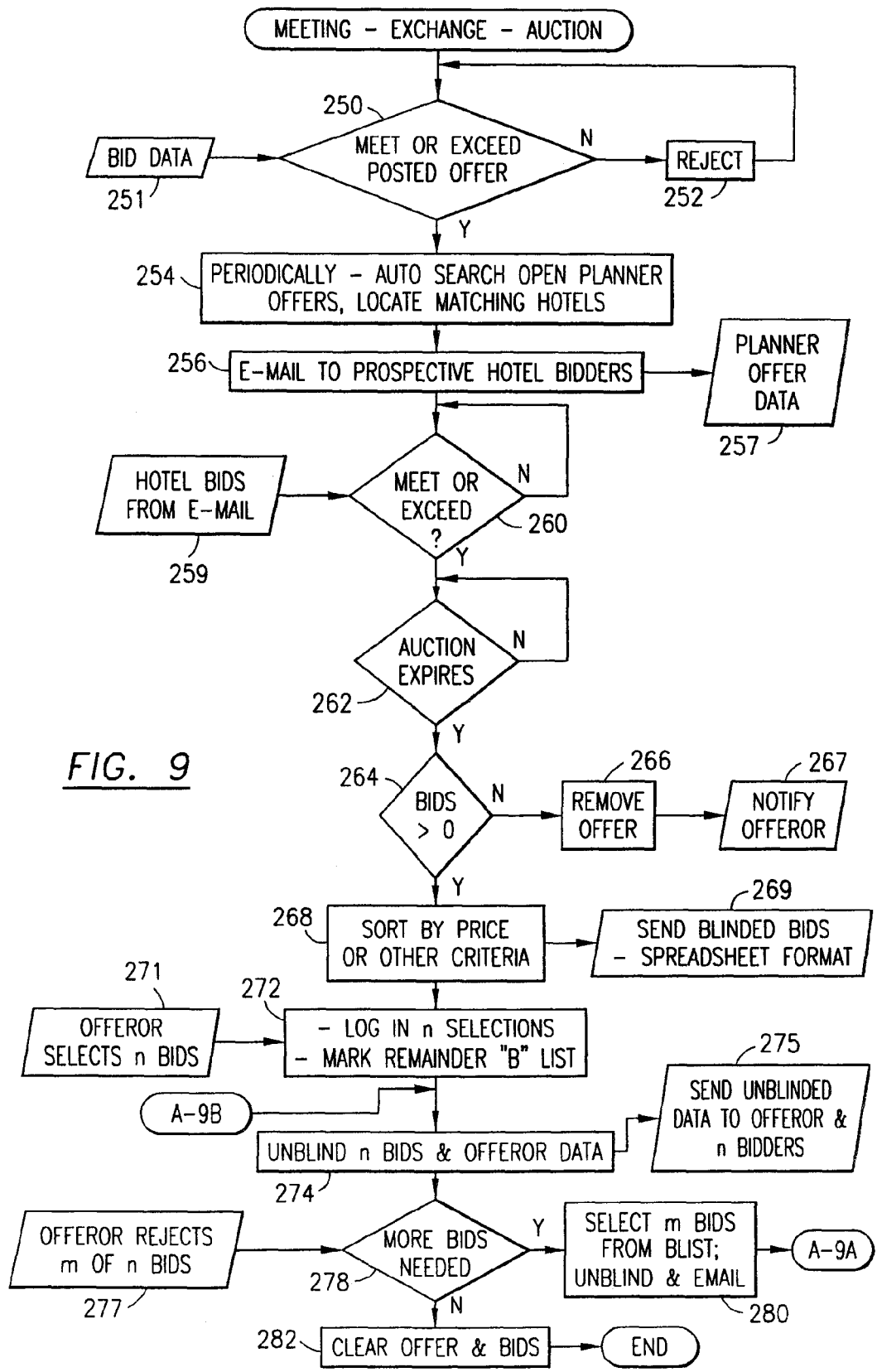
FIG. 9 diagrammatically illustrates an auction routine.

FIG. 9 shows the auction or match or exchange routine for the present invention. The system in FIG. 9 may be truncated to achieve a more efficient matching system. As stated earlier, bidders, both hotel registered users and meeting planner registered users supply bid data, noted as input 251, into the system. Decision step 250 determines whether the input bid data meets or exceeds any particular offer. If not, the NO branch is taken, the system generates a reject message in step 252 and returns to a point immediately preceding decision branch 250. Meeting planner offers are sometimes called "requirement data" herein. Hotels or other hospitality vendors post hotel bids with are sometimes identified as "specific hospitality facility data." The specific hospitality facility data or hotel bids must meet or exceed the request for quotes or requirement data from meeting planners. Meeting planner offers are also sometimes called "necessities" or "retirement data" or "facilities requirement data." Hospitality facilities post offers which are sometimes called "facilities offer data." Meeting planners submit bids to the facilities offer data and sometimes these meeting planners bids are called "specific facilities requirement data."

If the YES branch is taken from decision step 250, step 254 periodically searches the offer and bid database 68-70 to locate open meeting planner offers (requirement data, facilities requirement data for facilities necessities), and the system automatically locates facilities or hotels matching those open planner offers. In step 256, an e-mail is prepared with blinded facilities requirement data or offers. The blinded data excludes the name and contact data for the meeting planner-offeror. Output step 257 sends planner offer data to the registered user hotels.

If the registered user hotel vendor wants to bid on those outstanding meeting planner offers, the hotel submit the bids in step 259. In other words, the hotels respond to the e-mail. In the present embodiment, the response is provided via the Internet wherein the hotel utilizes a client computer to access the central computer 20 established by the administrator operating the present computerized system. Decision step 260 determines whether the bid data from the hotel (specific hospitality facility data) meets or exceeds the meeting planner bid (facility requirement data). If not, the NO branch is taken and the system loops to a point immediately before decision step 260. If the bids exceed the meeting planner offers, the YES branch is taken and the system executes decision step 262. In an efficient matching system, offers may be called requests for quotes or RFQs. Assuming the hotel bids match, to some degree, the MP's needs, step 268 sorts and orders the hotel and facility data, step 269 sends the data in spread sheet form to the MP, and then the MP selects to negotiate with one or more of the bidding hotels-facilities. The efficient system ends at this point other than to clear RFQs (offers) and bids step 282. The system may maintain a bid list and a booked list for future reports.

Decision step 262 involves an automatic review of all outstanding offers, whether those offers are meeting planner offers (facilities requirement data) or whether those offers are hotel offers (facilities offer data). Decision step 262 determines whether a particular auction or exchange time has expired. As stated earlier, the auction or exchange time frame closes in 5 days, 10 days, or 15 days as selected by the offering party. Once the system determines that the auction time has expired, the YES branch is taken and decision step 264 determines whether there is one or more bids for a particular offer. If not, the NO branch is taken and the system in step 266 removes the offer from the system and an output step 267 notifies the offeror that no bids have been placed. If the YES branch is taken from decision 264, the system executes step 268 which sorts the bids by price, by total revenue for a hotel offeror, by composite rating for a planner offeror, or other criteria. Tables 20 and 21 which follow provide two examples of sort routines for a Meeting Auction Sort Order (Table 20) and a Sort Hotel Auction Criteria (Table 21).

TABLE 20

Meeting Auction Sort Order Table (1) Auction Expiration Date, (2) Dates Requested (First),
(3) Max # of Rooms, (4) Min # of Rooms, (5) State,
(6) Type of Hotel, (7) Min Price, (8) Largest Meeting Room The hotel offers are sorted by the following Sort Hotel Auction Criteria Table.

TABLE 21

Sort Hotel Auction Criteria Table (1) Auction Expiration Date, (2) Dates Available (first), (3) Max# of Rooms, (4) Min# of Rooms, (5) State, (6) Type of Hotel, (7) Min Price, (8) Largest Meeting Room After the sort function in step 268, the system sends, as an output in step 269 blinded bids in a spreadsheet format to the offering party. Other output formats may be utilized. The bids are placed in a sorted order, typically keyed to price. However, the Sort Order Tables 20 and 21 show that date availability has a higher priority then price. It should be noted that other sort criteria and prioritization may be utilized.

In input step 271, the offeror selects n number of bids and inputs that selection via the Internet (in a preferred embodiment) into the system. Herein n is three (3). The system operator may change n. Step 272 logs in n selections into the system and marks the remainder of the outstanding bids as "B List" or non-selected bids. In a current embodiment, the offeror selects the top three (3) bids based upon subjective or objective standards. Accordingly, if the offeror were sent 10 prioritized blinded bids (not showing the name and contact information of the bidder) in output step 268, the offeror in step 271 selects 3 of the 10 bids. The remaining 7 bids are placed on a non-selected or on a B List.

Step 274 involves compiling unblinded n bids and unblinded offeror data. Output step 275 sends that unblinded n bid data and offeror data to the specific offeror and n bidders.

Input step 277 recognizes that the offeror may reject m number of the n bids. In other words, the offeror could reject all three unblinded bids. In this case, n=3 and m=3. Alternatively, the offeror may reject one (m=1) bid. Decision step 278 determines whether additional bids from the B List or non-selected list are needed. If so, the YES branch is taken and step 280 selects m bids from the B List, deletes the non-selective bids from the n bids sent to the offeror in step 275, unblinds the m bids and e-mails those m bids to the offeror and the m bidders. This is an exchange of contact data. Accordingly, the system keeps anonymous the bidder's names until the offeror selects n number of bids and sends unblinded data to the n bidders and the offeror. In this manner, meeting planners who are offering facilities requirement data for meeting are not bombarded or annoyed by a large number of hotel vendors bidding on the facilities requirement data or meeting offer. In a like manner, a hotel posting a facilities offer data is not bombarded with a large number of unsolicited bids from meeting planners. From the bidders' standpoint, the system is beneficial because one or more bidders may participate in an auction or data exchange using various specific hospitality facility data (hotel bids) or specific facilities requirement data (meeting planner bids) which are "out of the normal range" or "far fetched" bids. In the event those bids are accepted by the counterpart offeror, the bidder is financially rewarded by filling up his or her facility (if the bidder is a hotel) or by fulfilling a meeting plan offer (facilities requirement data) which plan was an unlikely candidate to fulfill. For example with respect to hotels, the hotel may wish to severely discount the price of 10% of their rooms during off-season when their normal vacancy rate is 30% or higher. The hotels may wish to let those rooms at a significantly discounted price in order to keep an occupancy rate of 70% or higher during an off-season period. Meeting planners responding to this hotel offer could take advantage of this discount during non-peak seasons. If the bids are completely out of range, that is, other bids come in that are significantly better from the offeror's view point, the blinded nature of the bids shields the bidder from embarrassment and harassment. Hence, there is a significant benefit to both the offering party and the bidding party with the present system.

The output from step 280 regarding the selection of m bids from the B List, deletion of n bids from the original A List and the unblinding and the e-mailing of contact data and full offer and bid data involves a jump from jump point 8-9A to 8-9B, that is, immediately preceding the unblind bid step in step 274.

If no more bids are needed from decision step 278, the NO branch is taken and, in step 282, the offers and the bids are cleared from the system. The system program ends after clear step 282. It should be noted that clear step can be modified such that unwanted bids can be recycled to other auction periods.

Figure 10:
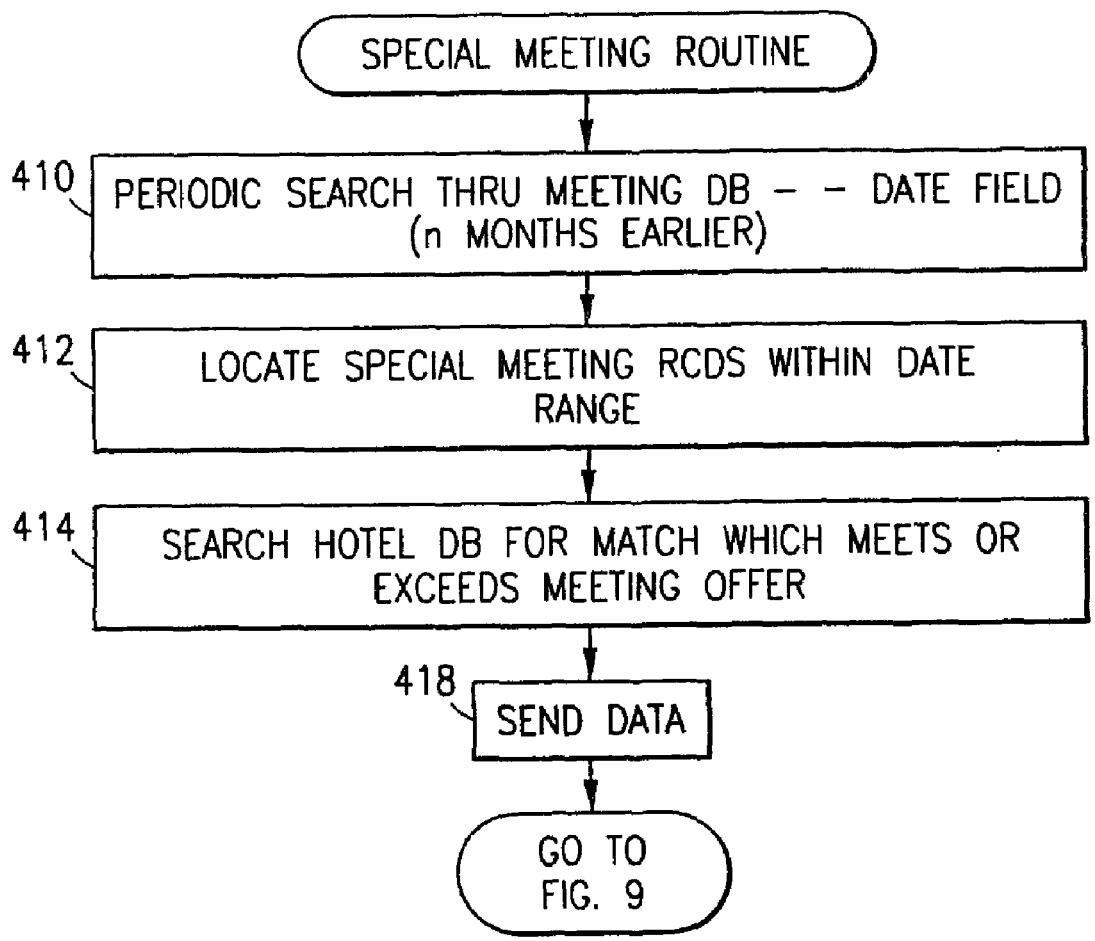
FIG. 10 diagrammatically illustrates a special meeting offer posting routine.

FIG. 10 diagrammatically illustrates a special meeting routine which enables meeting planners to post periodic corporate meeting data in the database. Table 22 which follows lists the special offer criteria. The special meeting data is not made available to other meeting planners or to hotels unless authorized by the posting planner.

TABLE 22

Meeting Planner - Special Offer Criteria

A. Meeting or Event Name (assign rcd id)
   1. Month-Year
   2. Region - state (drop down menu *)(optional closest major airport)
   3. Hotel type *
   4. Number of Rooms
   5. Price per room (maximum price)
B. Meeting Name
   [same data as above]
C. Meeting Name
   [same data as above]
D. Meeting Name
   [same data as above]

Step 410 conducts a periodic search through the meeting database date field at a certain time period earlier than the event date. This is identified in FIG. 10 as n months earlier. A period n days earlier may be utilized. This step is optional. The planner may simply visit the web-based system to check search results for a special meeting plan. Step 412 locates special meeting records within the date range search. Step 414 searches hotel database for matches which meet or exceed the potential special meeting offer. The special event is not truly "an offer" since the meeting planner has not confirmed the prospective event.

Step 418 sends information or blinded data, typically via e-mail, to hotels which match the prospective meeting planner offer. The hotels are reminded to post offers on the prospective meeting planner offers. Similarly, the posting planner is reminded to post a formal planner offer for the event.

The system may also be modified to (a) initially match hotels with the potential planner offer, (b) monitor the potential planner offer (PPO) such that when the PPO becomes final or becomes an actual planner offer, then (c) pre-selected hotels are immediately notified. See step 256, FIG. 9. Also, weekly e-mail reminders to prospective bidding hotels. This weekly (or daily) reminder system may be added to step 256 in FIG. 9.

In some situations, it may not be necessary to exchange blinded offer data or blinded bid data. For example in connection with single, large hospitality vendor (e.g., MARRIOTT), all bidders would know the vendor. Hence blinded vendor hospitality offer data is not utilized. A similar situation arises for large meeting planners (e.g., AMERICAN EXPRESS travel agents). The appended claims are meant to cover this aspect.

Figure 11:
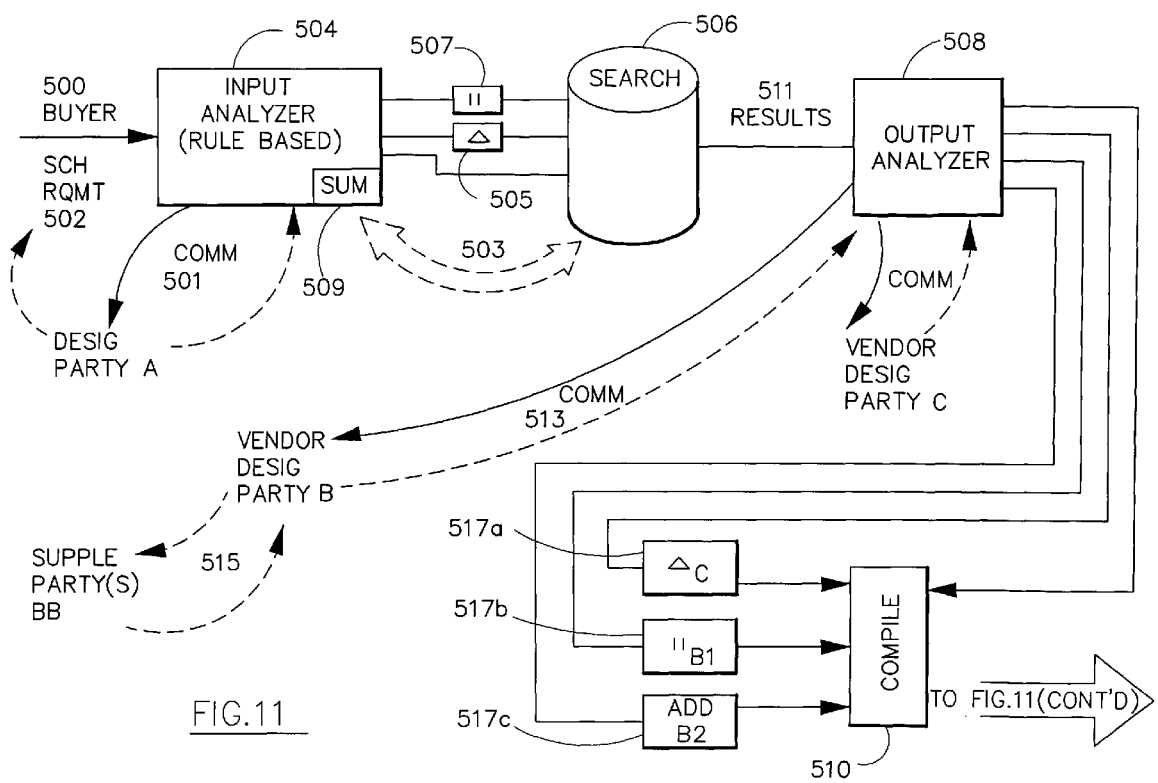
FIG. 11 diagrammatically illustrates a simplified flow chart showing major functional aspects of the input analyzer, output analyzer and third party communications and input aspects (both from the buyer-MP side and the seller-hotel side) in an enhanced version of the system.
Figure 11:
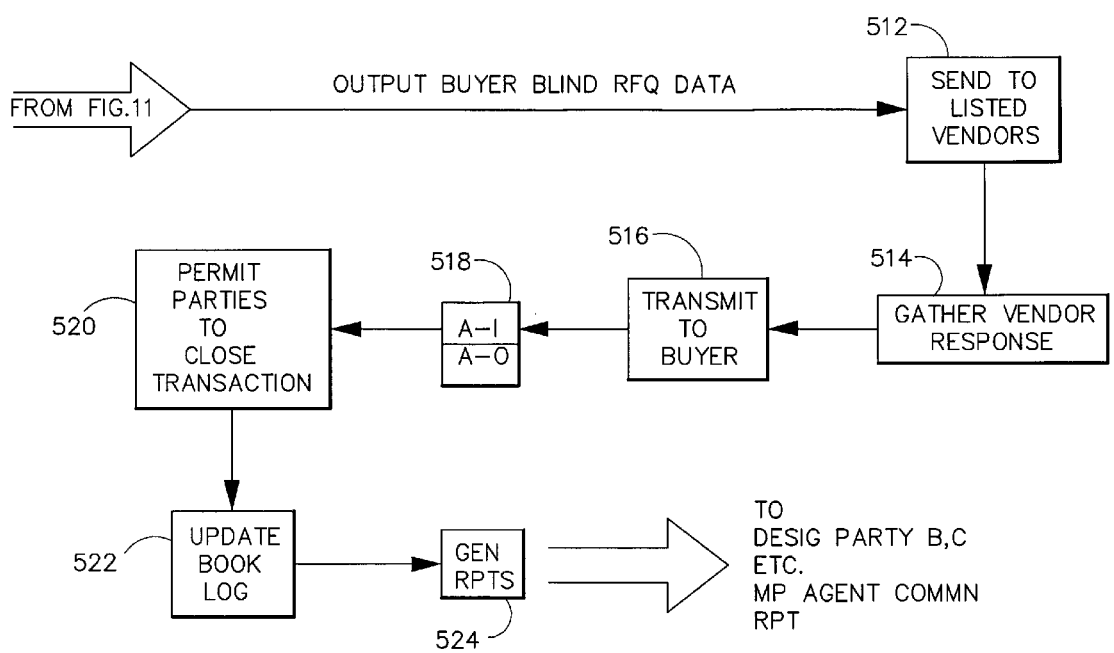

FIG. 11 diagrammatically illustrates a general flowchart showing the adaptive computerized bidding, matching and information exchange method as well as system modules or components. Buyer 500 inputs a search request for a facilities requirement 502 into a system (see computer system 20, FIG. 1A). System 20 would include, in one embodiment, functional blocks for input analyzer 504, search function 506, output analyzer 508, search result compiler 510, transmit or sent to vendor function 512 (optionally as blinded RFP data), gather vendor response function 514, transmit to buyer function 516, supplemental input analyzer (A-I) and supplemental output analyzer (A-O) 518, permit party to close function block 520, update book log 522 and generate report function 524. In another embodiment explained in detail with respect to FIGS. 15A and 15B, input analyzer 504 is distributed to the client side of the webserver—client module system as an adaptive client-based input module or method in one of the client computer machines 14, 16 (FIG. 1A) and functional blocks 506, 510, 512, 514, 516, 520, 522 and 524 are deployed or integrated in server 20. Output analyzer 508 may be an adaptive client based output module or method deployed in a different client (vendor) computer, such as client computer 12 in FIG. 1A or may be incorporated into server 20.

MP Buyer 500 inputs a search facilities requirement 502 which is sometimes identified herein as meeting requirement data. This MP input is a search inquiry or RFQ for matching hotels or other hospitality vendor services or facilities. At a minimum, the meeting requirement data is obtained from at least one meeting planner (MP) of a plurality of MPs and includes MP contact data, facilities requirement data, date range data and price data. Other minimum data sets may be used. MP contact data may be previously stored in the server memory. Date range data generally includes the first and last dates for the meeting or event sought to be scheduled by the inquiring meeting planner.

Input analyzer 504 is rule based and is adaptive to MP supervisor input or to conditions sensed by the filter analyzer. Analyzer either monitors the meeting requirement data inquiry or search requirement 502 or, as an iterative process, monitors the search results from search function 506 which searches through data organized in a data structure, and adaptively changes the inquiry. As discussed earlier, the data structure (data base or spreadsheet or organized record system) is typically located in server 20 (FIG. 1A) and is accessible over the Internet 10 or other telephone or other communications system by various client-based computers. The input analyzer is rule based but is adoptive (changeable) in that the rules may require that the analyzer be changed based on certain features of the search request or search results. For example, if MP buyer 500 is scheduling a group meeting for corporation A (Corp. A), input analyzer 504 may monitor the room quantity (250 rooms) in the RFQ (search inquiry) and, based upon the class of the MP buyer 500, (for example MP buyer 500 may be an employee of Corp A or may be a long time contractor with Corp. A) and based upon the log in ID of MP buyer 500 and the 250 room quantity in the meeting requirement data or search requirement 502, input analyzer 504 generates a communication to a designated party A. In a particular embodiment, the designated party A is a planner supervisor (MP super) or, in a more particular case, the VP for corporate travel for Corp. A. Communication 501 to MP super (designated party) is noted in FIG. 11. Again assuming MP buyer 500 is an employee of Corp A, thereby falling in the class of MPs employed by Corp. A, VP travel is notified. If MP buyer 500 inputs a request for a single hotel room in five (5) major cities over time t, analyzer 504 determines that this request is a transient or frequent traveler RFQ and the analyzer 504 would then pass the request directly to search function 506 without notice to VP travel to facilitate the search through the data structure organized and maintained in server 20. No communication 501 is generated for planner supervisor designated party A. Therefore, adaptive analyzer 504 has predetermined rules or filters to monitor the search request RFQ based either on the class or category of the inquiring MP, the type of search (or characteristics thereof) or the search results (e.g., to add preferred hotels to the potential HF list).

Returning to the 250 room request, designated party or supervisor planner A may communicate with MP buyer 500 as shown in the dashed lines in FIG. 11 or may alter input analyzer 504 to permit MP buyer 500 to conduct the search or add hotels, or expand the search or limit the search to specific types of HF properties or add geographic limits. In this sense, designated party A (VP Corporate Travel, Corp. A) authorizes the search to go forward. Another alteration of the search may be a limit to preferred hotels or hotel vendor or geographic limits (certain cities or certain regions) or time periods input on a temporary business into the rule based analyzer 504 by supervisor planner party A. In this sense, planner supervisor party A is modifying the search or the meeting requirement data inquiry. Of course, the system could be set-up that once a search is input, the search engine 506 accesses the data structure and returns the search results and input analyzer 504 analyzes the search results. For example, to add preferred HF properties or exclude expensive facilities. This iterative function is shown by the parallel dashed lines 503 in FIG. 11. A change in either the meeting requirement data inquiry or search results is shown by change or delta block 505. When search results are blocked or an entire meeting requirement data inquiry is blocked, this action is shown by function block 507. The filter analyzer may automatically block the inquiry or search result or may block further inquiries due to VP Travel communication.

Another potential analysis by analyzer 504 is a summation function 509. The summation function adds the booked costs of the hotels and airlines (automatic data gathered or required MP input) booked by MP buyer 500 over a certain time frame (such as monthly, quarterly or annually) and once that summation exceeds a predetermined level set by planning supervisor party A, analyzer 504 will either block the meeting requirement data inquiry from the posting MP buyer 500 or send out communication 501 to designated party A, the planning supervisor. In this sense, the planning supervisor via communications link 501 is notified when MP buyer 500 exceeds a predetermined budget. Analyzer 504 is then a filter, trigger notifier, search modifier, authorization module and monitor of the MP, the search request and the search result.

Analyzer 504 could provide summation characteristics for an entire class of MP buyers, such as all the MP buyers seeking to secure hotel and other hospitality facilities for IBM (Corp. A) employees. In this sense, input analyzer 504 operates as a budgetary control. If the planning supervisor wishes to override the budget, a return communication (shown by dashed lines from party A to analyzer 504) is required indicating that the supervisor has either authorized the search or modified the search for a change in authorization level.

Another alteration of the search results which may be automatic by analyzer 504 is the addition to the search results of preferred vendors such as preferred hotels. Change function 505 represents this alteration in the search results. Therefore, after the meeting requirement data inquiry from MP buyer 500 is input into the system, analyzer 504 and search function 506 may produce an iterative process sometimes involving a communication with planning supervisor party A and sometimes not. Sometimes, analyzer 504 changes either the meeting requirement data inquiry or the search results based upon predetermined parameters that are set for a class of meeting planners. There are many types of predetermined parameters which could be applied. The foregoing tables may have limit functions or notice trigger levels. For example, if MP buyer 500 is an independent planner, the analyzer 504 may only return search results which pay a commission to the meeting planner. Other hotels or other hospitality vendors that do not pay commissions will be deleted from the search results by analyzer 504.

Communication 501 to planning supervisor party A may take many different forms. An e-mail, a telephone call generated by an interactive voice response IVR system, a fax, a page to a pager or a cell phone reminder or a blackberry reminder is included in communication 501. Responsive communication YES/NO, OK, NEGATIVE, may be automatically detected by the analyzer. Likewise, planning supervisor party A may alter analyzer 504 by any reasonable means including computer input via a client based input screen or module into a web server, a IVR voice recognition (typically authorization), email response or other electronic data input.

It should be noted that after the search is initiated by function 506, the system may operate as discussed above in connection with FIGS. 1-10 without the implementation of output analyzer 508. In a similar sense, input analyzer 504 may be omitted from the adaptive computerized bidding and output analyzer 508 may be singularly utilized. The class of meeting planners is any type of grouping of meeting planners which is reasonable. The meeting planners may be employees of corporation A, may be designated MPs for a certain corporation, may be independent meeting planners or may be employees of a company which is a service provider to one or more corporations wherein the employees of that service company are assigned a class or category. Sub-classes may exist within classes. The invention also assumes that planning supervisor party A can change the classification of an MP buyer. As discussed above, search function 506 matches hospitality facility HF data which represents vendors furnishing HF facilities as well as meeting room facilities and other hospitality facilities (tennis courts, golf courts) with the meeting requirement data or request for quotes RFQs. At a minimum, the HF data includes vendor contact data, location data, room quantity data, date available range data, meeting room data. This data is organized in a data structure discussed earlier. Other minimum HF data sets may be used. The search results discussed are the matching HF data which matches the meeting requirement data inquiry. Analyzer 504 conducts an analysis based upon predetermined parameters for a class of meeting planners and either alters the search request, alters the search data or contacts planning supervisor party A. All three activities may be provided by analyzer 504 or one of the activities may be provided by analyzer 504. In any event, the input analyzer 504 is adaptive in that the analyzer either changes the search inquiry, changes the search results, or establishes a communication with a designated party A, the planning supervisor. At the option of the MP, after the search, search results are sent to vendors (HF vendors) without identifying the MP contact data. Otherwise, the RFP contains MP contact data. Thereafter, the HF vendors submit bids and the bids are supplied to the MP buyer 500. Characteristics monitored by analyzer 504 include total hospitality cost per predetermined period of time, average price per room per each search results compiled, location, room quantity, and meeting room data. Other characteristics could be included in analysis function 504.

Results 511 are transmitted from search function 506 to output analyzer 508. Analyzer 508 is another adaptive filter or modifier of the search results. The output adaptive analyzer-filter operates on the search results and with HF vendors. In this situation, output analyzer 508 has, stored therein, predetermined characteristics of the search results (or the search inquiry) which cause a generation of a communication 513 to a vendor designated party B 515. The designated party B typically is a vice-president or officer of a flag corporation wherein the flag corporation licenses its name to a plurality of other hotel vendors. For example, the Marriot flag licenses its trademark and trade styles to various "Marriot" hotels which are owned by other parties and operated by different entities. Sometimes, designated party B is identified herein as a vendor promoter. The flag VP promotes hotels in its system. In any event, communication 513 is sent to vendor promoter party B based upon analyzer 508 identifying one or more points or characteristics found in search results 511. Supplemental, vendor promoter B may engage in further supplemental communications 515 to supplemental parties BB. The supplemental parties BB may be sales directors or sales associates in the management companies in one or more hotels carrying the flag of party B. As a result of these supplemental communications 515 and communication 513 to vendor promoter party B, party B may submit instructions to analyzer 508 to change the search results. This change may include adding a certain hotel property or HF properties, deleting certain hotel properties or adding complementary hospitality vendors. The changes to output analyzer 508 may be made by an automated sub-system at the designated party B 515. This automated data return sub-system may at as a live inventory control for the HF vendor. Other auto-responders are possibly linked to the HF booking data base. Typically, vendor promoter party B is only permitted to alter the search results for vendor properties carrying the flag B. Therefore, function blocks 517*b* and 517*c* delete a property (block 517*b*) and add a B flag property (function block 517*c*). In some situations an HF vendor will temporarily remove room or HF inventory for a set period of time which results from 9*a*) an out-of-system block booking of hotel rooms; (b) renovation or (c) construction. Other auto-responders could link the system to live inventory data bases. With respect to function block 517*a*, vendor promoter party C obtains a communication from output analyzer 408 for C properties and changes the search results as noted by function block 517*a*. The predetermined characteristic analyzed by output analyzer 508 may include an analysis of the meeting requirement data to determine whether it exceeds a certain threshold for location, room quantity or meeting room data. For example, Marriot properties may want to bid on all conventions in the greater New York City area. This is a location determination in analyzer 508. Concurrently, Marriot may want to bid on all hotel events needing more than 500 rooms. This is a room quantity characteristic. Further, Marriot may want to bid on all meeting RFQs where the meeting room requirement exceeds 50 people. This is a meeting room data characteristic. Of course, many other characteristics could be employed in output analyzer 508. Some of these characteristics are discussed earlier in conjunction with FIGS. 1-10. Output analyzer 508 and search function 506 may be initiated as an iterative process with multiple communications to vendor promoter party B and vendor promoter party C. Any responsive communication from B, C may be time limited, for example 24 hour response required. Analyzer 508 may automatically detect the HF promoter response and change the search results. In a similar manner, output analyzer 508 could generate communication to party B and party C based upon preset hospitality facility data which appears in the search results. For example, Marriot party B may want to add all Marriot Courtroom Hotels (a lower rating property) whenever J.W. Marriot and standard Marriot hotels (higher rated properties) are found in the search results generated by search function 506.

Step 510 compiles the search results after the adaptive filters. Step 512 sends inquiries to the hotels identified in the search results. Optionally, the MP contact data is removed from this request for quote RFQ. Currently, the MP contact data is sent out to HF vendors. Therefore, each Marriot hotel listed in the search as modified by input analyzer 504 and output analyzer 508 would receive an invitation to bid on the event input initially by MP buyer 500. Step 514 gathers responses from the HF vendors. All of the HF vendors receiving the communication from step 512 may respond but typically fewer HF vendors respond to the screened RFQ. In step 516, the system compiles this bid information into a convenient format, typically an electronic spreadsheet, and this electronic spreadsheet for HF vendor bids is transmitted to the inquiring party, the MP buyer 500. Function block 518 recognizes that an input analyzer 504 (A-I) and output analyzer 508 (A-O) may be incorporated into the system at this juncture. Input analyzer A-I and output analyzer A-O can be located at various stages of this process. These analyzers operate in a similar manner to functions 504, 508. Further, the RFQ information may be sent to additional HF vendors (optionally blinded RFQ data) and many other parts of the system may be an iterative process. For example, if no HF bids were returned the A-I may automatically broaden the search inquiry.

Step 520 recognizes that the parties are permitted to close the transaction or book HF facilities. Typically, MP buyer 500 will directly communicate with one or more selected HF vendors (selected by the MP) based upon the HF vendor bid sent to the buyer in step 516. Step 522 recognizes that the MP buyer 500 has not only selected HF vendors but has booked the event. Step 522 recognizes that the booking of the HF vendors by a particular MP buyer should be logged into the system. Step 524 generates reports. These reports will typically include bid data sent to the MP buyer, bid data sent to the planner supervisor party A, bid data unique to the flag hotels sent to vendor promoter party B, and separate bid data for flag hotels C sent to vendor promoter party C. If the MP buyer 500 is an independent buyer, a commission report showing bids and booked events can be distributed to the MP buyer. MPs only get data correlated to their initial postings. Hotels only get bid data relative to bids they submit but do get booking data correlated to submitted bids. Bid data is always confidential.

Figure 12:
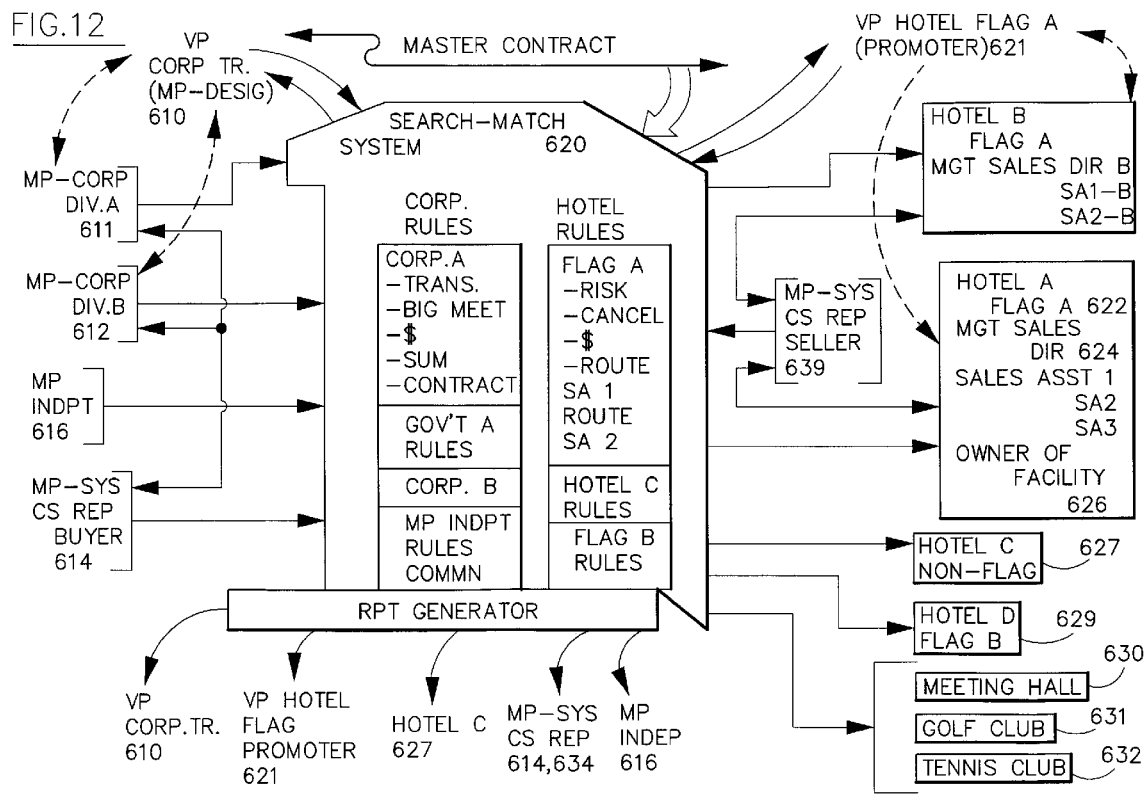
FIG. 12 diagrammatically illustrates organizational and communications routine for the adaptive method and system.

FIG. 12 diagrammatically illustrates some of the organizational aspects of the present invention. The VP corp travel 610 is a designated party MP planning supervisor for two meeting planners MP-corp division A 611 and MP-corp division B 612. As shown in FIG. 12, there may be communications between meeting supervisor 610 and MPs 611, 612. Additionally, in order to improve the quality of the search and provide additional service, the operator of the search-match-bid system may provide a customer service representative (CS rep) on the buyer side 614. This is shown as MP-Sys CS Rep buyer 614. The CS representative 614 communicates with MPs 611, 612 and assists these MPs in formulating either search request or improving the search results after the search request. An independent meeting planner 616 is also identified on the left side of FIG. 12. The search-match-bid system 620 accepts input from the planning supervisor 610 as well as input from the vendor promoter for the VP of hotel flag A. In one embodiment, planning supervisor 610 and flag A vendor promoter 621 have negotiated a master contract for travel or HF facilities. For example, planning supervisor 610 may represent a vice-president of IBM and vendor promoter flag A may represent a vice-president of the Marriot flag parent corporation. These two vice presidents establish a master contract and the terms of the master contract, or part of the terms of the master contract, are loaded into system 620. Due to the economic structure of the hotel vendors, many flag companies do not own the hotels providing the services. Therefore, with respect to hotel A, flag A 622, that hotel will have a management sales director 624 and sales associates 1, 2 and 3. Also, hotel A flag A 622 has an owner of the facility 626 which typically is a different entity from the management operator. The master contract established between planning supervisor 610 and vendor promoter flag A 621 is not necessarily accepted by the management of hotel A flag A 622. The sales director 624 has an obligation to maximize the operation and revenue of hotel A on behalf of the management company and on behalf of the owner of facility 626. Therefore, although the meeting planning supervisor 610 and the vendor promoter flag A 621 have negotiated a master contract, hotel A flag A 622 may accept or reject or modify the terms of that master contract. Hotel B represents a separate facility which operates under flag A. Hotel B has sales director B and sales associates 1-B and 2-B. Hotel C 627 is not a flag hotel but is an independent hotel. Hotel D 629 carries a different flag B. Other hospitality or HF vendors include meeting hall 630, golf club 631 and tennis club 632. It should be noted that hotel A may have its own golf course but hotel D carrying flag B may usually contract with the services of golf club 631 in order to compete at the same level as resort hotel A which includes the golf course. On the hotel vendor side, the operator of match-bid system 620 may also have a customer service representative (CS rep) for the seller 634. CS rep seller 634 works with system 620 as well as hotel A flag A and hotel B flag A. In other words, the customer service CS rep seller 634 is unique to flag A HF vendors. In a similar sense, CS rep buyer 614 is uniquely associated to the corporation which includes division A and division B, that is, MP 611 and MP 612. Other groupings for the CS reps may be established.

The search-match-bid system 620 has on the input side corporate rules for meeting planners and on the output side hotel rules for the HF vendors. Therefore, on the input side, corporation A may have separate rules for transient or frequent travelers (traveling salesman) as compared with large events or big meetings. The corporate rule may involve a dollar amount per room or a total dollar amount per week or a total budget for a longer period of time. Exceeding a pre-set value of the average room rate multiplied by room quantity may trigger a notice email or a blocking filter. The corporate rules may include a summation feature and may include proposed, standard contract terms. The corporate rules also include different rule sets for different organizations, such as government A rules. It is well known that government employees have standard per diem expenses, these per diem expenses can be loaded into the input analyzer in the search-match-bid system 320. Corporate B rules are also incorporated into the input analyzer of the system. In addition, the independent meeting planner can have rules regarding sales commissions. For example, not all hotels may pay a commission for a booking by a meeting planner. If an independent meeting planner 616 was using system 620, it is important to that meeting planner to know which HF vendor (hotels, golf courses, meeting halls) pay commission. Further, the system 620 can act as a "trusted third party" to document not only the bids for any particular event posted by meeting planner 616 but also the actual bookings. By comparing the bid reports to the final bookings and to revenue and commission charts, MP 616 has an accurate view of his or her success.

On the other output side, the HF vendors (typically hotels) have output rules. Therefore, hotel flag A has rules regarding risks, cancellation procedures, minimum or maximum room rates per day, information regarding the routing of communications to sales agent SA1 as compared to SA2. For example, large parties may be assigned to sales agent 1 due to his or her experience level whereas small meeting events would be assigned to sales agent 2. The hotel rules include flag B rules as well as hotel C rules.

The report generator in system 620 generates reports for the corporate meeting planner, planning supervisor 610, the hotel promoter 621, the hotel 627, the customer service reps 614, 634 and the MP independent 616. The bid report to the corporate meeting planners and the independent meeting planners are unique to those searchers (or organizations) and the bids posted by the meeting planners. The bid reports to the hotels (HF vendors) only show bids posted by the HF vendors of the same flag or organization. They do not include other bids posted by other HF vendors. Of course, with respect to a single flag corporation, all the HF vendors for that flag would be included in that bid report. In addition to the bid reports, the booking reports are helpful in showing the success or failure of the scope of the bid and the actual booking of a particular event. Book reports are provided without regard to the HF provider organization.

FIG. 13 diagrammatically illustrates another flowchart for the present invention. In this situation, MP corporation division A 710 either posts a big meeting RFQ 712 or a transient frequent flyer or traveling salesman post 714. The buyer or input rule filter 716 had previously accepted input from the VP corporate travel or planning supervisor 718. The filter or analyzer 716 analyzes the search request and the system initiates a search and a match 720. For the transient posting 714, the system establishes a budget count which monitors the total amount of transient travel in function block 722. If the transient travel budget exceeds a preset level, an alarm communication 723 is sent to the VP corporate travel 718. Based upon the search result and match 720, a communication may be sent to VP corporate travel 718. A supplemental communications cycle 724 may be established between the VP corporate travel 718 and posting MP 710. The VP corporate travel 718 may alter or authorize the search as noted in function block 726. The system conducts a further search and match in 727. The transient posting 714 is not subject to the second search since the amount of the travel is small and a quick bid cycle is necessary for this frequent traveling sales person.

Function block 730 recognizes that the output filter or vendor rule filter is applied to the search results. A communication from rule filter 730 may engage a hotel flag VP 732. As discussed earlier, the hotel flag VP 732 is the vendor promoter. A supplemental communications cycle 734 with hotel A flag and hotel B flag (carrying the same flag is hotel flag VP 732) may be initiated. For example, the hotel promoter 732 may inform the supervisors at hotel A, hotel B that he wants those hotels to aggressively bid on the RFQs that are initially posted by MP 710. Hotel flag VP 732 may alter, add or re-search the system database and this function is noted in feedback 736 from hotel flag VP 732.

The output from vendor rule filter 730 is applied to send RFQ (optionally blind) to matching hotels step 740. These RFQs, which optionally do not include contact information for MP 710, are sent to hospitality facilities identified in the search results. Compiled responses function 742 notes that various HF vendors submit bids in response to the blind data RFQ. Send hotel offer data to MP division A in step 744 notes that a communication or bid report may be sent to the VP of corporate travel 718. After send hotel offer data step 744, an MP negotiate and book hotel step 748 is engaged. The communication or book report may be sent to VP corporate travel 718 from step 748. In the next step, a log booking event, step 750, is executed. The system in step 752 generates reports on a periodic basis, for example, annually, quarterly, monthly or weekly. These reports include report 754 sent to VP corporate travel 718. It would include the bid meeting or large event, transient reports, the bid reports and the booking reports. The system generates annual, quarterly or other time sensitive reports 752 also generates a hotel flag A report which includes a bid report for all flag A hotels and a book report for all flag A bids related to those bookings as shown as report 756. This report is delivered to hotel flag VP 732. These reports 754 and 756 are electronic reports. Therefore, the VP corporate travel 718 can easily integrate the bid and book report 754 with his or her expense reports generated internally after the event. In a similar manner, hotel flag VP promoter 732 can integrate the hotel flag book and bid report 756 with his or her HF revenue statement. In this manner, the purchaser of HF services (the corporation) and the sellers or vendors of HF facilities can compare their bids, their final bookings relative to their bids, and the ultimate revenue or expenses associated with the bookings. This reporting provision enables the VP corporate travel 718 (the planning supervisor) and the vendor promoter (hotel flag VP 732) to negotiate either better contract terms, more aggressive room pricing policies, or more amenities or other features to increase their revenue or reduce their expenses. Additionally, step 752 generates a report for hotels not associated with larger organizations, a non-flag report, and this report is also a booking and bid report for flag C. Step 762 recognizes that the input and output filters 716, 720 can be changed. In step 764, the system repeats its functions.

FIG. 14 diagrammatically illustrates the contract provision or program module. Step 810 recognizes that the contract sub-routine follows from the main system flowchart. In step 718, hotel offer data is sent to the MP posting the bid. A communication is also sent in the form of a bid report to the VP corporate travel 718. In step 814, the system generates a contract with variable terms. For example, a single contract may be negotiated between IBM and Marriot. However, for large or big events, IBM may use both Marriot HF but also Hilton HF. Hilton may have a different contract with IBM. These contracts, with separate provisions, are available on line in the computer system of the present invention. Some of the terms can be automatically required or inserted by the standard form contract. Other terms could be selected by the MP planner posting the RFQ. Other terms may be added by the sales agent at the particular flag hotel or non flag hotel. Further, variable items in this contract provisions such as the number of months available for cancellation (pull down menu, 30 days, 60 days, 90 days, etc.), the amount of liquidated damages for the cancellation and others, may be input first by the MP planner or input by the sales agent at the HF vendor. Therefore, drop down menus for standard variable terms may be noted. The user may select, by check box, entire paragraphs or delete entire paragraphs or provisions. Some of the contract terms are set forth below:

| Contract Term Table |
| --- |
| Number of complementary rooms compared with booked room (1/40) |
| Lowest room rate guarantee |
| Minimum attrition (the percentage of under utilization of a booked event which will not cause a penalty (for example, attrition greater than 20% of the booked amount results in a penalty of $10,000.00)). |
| No tax or service fee added to liquidated damages clause. |
| No tax on gratuities such as food and beverage. |
| A representation from the HF vendor that there is no construction and that all facilities are operational. |
| No service fee on equipment. |
| If cancellation, and event rebooked within one year, rates stay the same, or increase less than X percent. |
| Food and beverage and other minimums amounts. |
| Invoicing policy. |
| Payment policy. |
| Indemnification clause. |
| Terms of force majeure. |
| Confidentiality. |
| Cancellation for convenience. |
| Cancellation in light of natural disaster. |
| Days before cancellation. |
| Amount liquidated damages. |
| Mediation/arbitration. |
| Dispute resolution, venue, jurisdiction. |
| Insurance. |
| Limitation of liability. |
| Representation of warranties. |
| Americans with disabilities facilities. |
| Governing law. |

In step 816, the MP posting the RFQ selects the terms. A communication may be engaged with the VP corporate travel 718. In step 818, the proposed contract is sent to both the MP and the selected hotel or hotels. Step 820 recognizes a negotiation between the posting MP and selected hotel from the search results. Step 822 recognizes that a final contract has been negotiated. This final contract may be stored in the system and sent to the vendor hotel as well as the posting MP person. Step 824 logs a "booking" into the system. Step 826 generates a report. Returning to step 816, the contract terms may be selected by the sales associates and the vendor hotel rather than initially selected by the posting MP person.

Figure 15A:
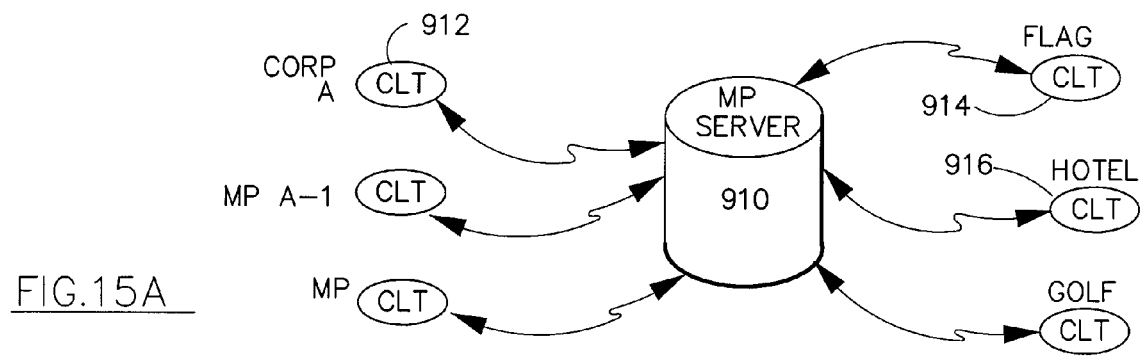
FIGS. 15A and 15B diagrammatically illustrate a web-server implementation of the system and method and a client-based input sub-system, coupled to a more basic MP-hotel database server (which optionally includes embedded filters and analysis functional routines for other MPs and hotels, other than the client-based input and client-based output sub-system).
Figure 15B:
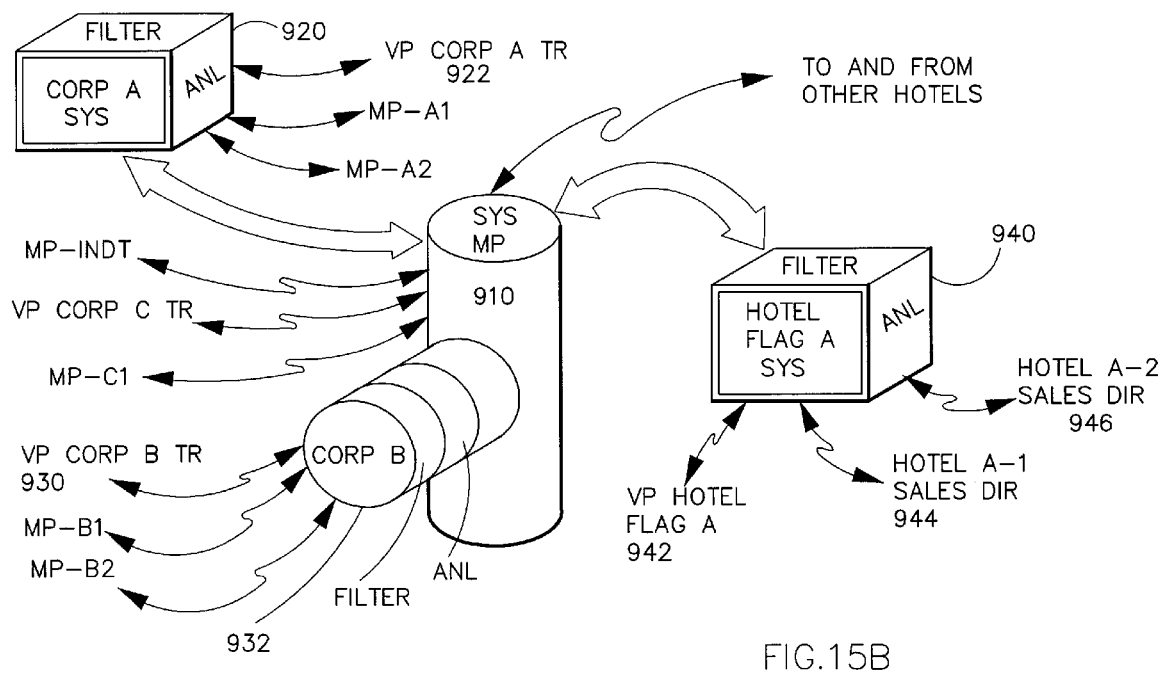

FIGS. 15A and 15B diagrammatically illustrate several systems which may be employed in operating the present method and system. FIG. 15A shows that the MP server 910 retains almost all the programs and the data. The web server with the structured database uses thin client modules as input and output devices for MPs and HF vendors. Various MPs such as corporation A, MP A-1 and MPn use client input modules one of which is module 912 to input the search inquiry and retrieve the search results and generally communicate with the MP web server. This is a classic web-based server situation. Communications to planning supervisor will be originating from the MP server 910 via an appropriate communications channel, email, Blackberry, IVR telephone or IVR cell phone. On the output side, the vendors, such as a flag vendor promoter, a particular hotel or a supplemental facility such as golf course, employ a client module one of which is client module 914. Therefore, a flag hotel would receive all RFQs with other results of a search from the MP server 910. That particular flag hotel will then post a bid through the client module 916 and the data will be sent or transmitted to MP server 910. All the bids from all the hotels and HF facilities will be gathered and compiled in a bid report. The bid report could be sorted as pre-established by the MP planner. After the bid reported is presented to the MP planner, the MP planner selects one or more of the vendors listed on the bid report (or conducts another search) and then contacts those selected HF vendors. The supplemental communications contact may occur through MP server 910 or may occur independently through the telecommunications network. Eventually, if the contract "building" subroutine is employed, the posting MP planner and representatives from the HF vendors use the MP server to draft the contract.

FIG. 15B recognizes that the client-based program modules may be separated from the MP server 910. Vendor output modules may also be separate client-based modules or methods. Therefore, with respect to large corporate travelers, the adaptive client based input method and module 920 may be maintained outside and away from the MP system server 910. In this sense, the VP corporate travel 922 will communicate with corporation A computer system 920. The filter and analyzer ANL is loaded into the corporate A computer system. MP-A1 and MP-A2 first communicate with the client based input filter and analyzer on corporate A computer system, the filter and analyzer being functional block 920 which is discussed in detail with respect to FIGS. 11, 12 and 13 earlier. Communications between MPA1 and VP corporate travel 922 are somewhat faster when the client input filter and analyzer 920 are located in corporate A computer system. Data security is enhanced. The filter and analyzer 920 accesses the MP system 910 primarily to conduct the search and gather the search results. Further communications and bids from the vendor hotels are processed through MP server 910 and submitted to the filter analyzer 920 after the vendors have posted bids to the RFQs.

Other corporations such as VP corporate B travel 930 have a filter analyzer 932 which is part of the MP system web server 910. In this sense, the VP corporate travel 930 works with the MP web server 910 and particularly the unique corporate B filter and analyzer 932 is stored in a secured location in MP web server 910. Independent MPs can directly connect to MP server 910 as can VP corporate C travel and MPC-1 associated with corporation C.

On the output side, a large flag organization may have a client based output method and module 940. This output method and module is discussed earlier in conjunction with output analyzer 508 in FIG. 11. The analyzer and filter 940 it operates on hotel flag A computer system. The VP of hotel flag A 942 communicates with his or her corporate computer system. Hotel Al sales director 944 and hotel A-2 sales director 946 accesses hotel flag A computer system. The filter and analyzer 940 are maintained on flag A computer system. Search results unique to flag A hotel are sent from the MP server system 910 to the filter analyzer 940. Bids are posted from sales director 946 and sales director 944 via flag A computer system and ultimately to MP server 910. Other hotels subject to the search results communicate directly to MP server system 910 as discussed above.

The claims appended hereto are meant to cover modifications and changes within the scope and spirit of the present invention.

What is claimed is:

1. An adaptive computerized bidding, matching and information exchange method accessible on a telecommunications network for matching hospitality facility data, representing vendors furnishing hotel facilities, meeting room facilities or other hospitality facilities, said hospitality facility data including at least vendor contact data, location data, room quantity data, date available range data, and meeting room data, said hospitality facility data matched with meeting requirement data, representing respective necessities of a plurality of meeting planners for a corresponding plurality of meetings or events, said meeting requirement data including at least meeting planner contact data, facilities requirement data, date range data and price data, said hospitality facility data and said meeting requirement data organized in a data structure accessible via a plurality of client computers coupled to said telecommunications network, said data structure stored in a server also accessible and coupled to said telecommunications network, the bidding, matching and information exchange method comprising:

gathering, in said data structure on said server, said meeting requirement data as an inquiry from an inquiring meeting planner via one or more client computers;

searching said data structure on said server for hospitality facility data matching the meeting requirement data inquiry and obtaining search results;

matching the meeting requirement data and the hospitality facility data by said server;

conducting an analysis by said server of one of said meeting requirement data inquiry or said search results based upon a class of meeting planners which includes said inquiring meeting planner;

based upon said analysis, one of
altering said search through said data structure on said server,
altering said search results from said data structure on said server, or
from said server via said telecommunications network, generating a communication to a planning supervisor based upon said search or said search results; and exchanging meeting requirement data and contact data based upon said search results between said inquiring meeting planner and selected vendors associated with hospitality facility data encompassed in said search results via respective client computers over said telecommunications network from said server.

2. An adaptive computerized bidding, matching and information exchange method accessible on a telecommunications network for matching hospitality facility data, representing vendors furnishing hotel facilities, meeting room facilities or other hospitality facilities, said hospitality facility data including at least vendor contact data, location data, room quantity data, date available range data, and meeting room data, said hospitality facility data matched with meeting requirement data, representing respective necessities of a plurality of meeting planners for a corresponding plurality of meetings or events, said meeting requirement data including at least meeting planner contact data, facilities requirement data, date range data and price data, said hospitality facility data and said meeting requirement data organized in a data structure accessible via a plurality of client computers coupled to said telecommunications network, said data structure stored in a server also accessible and coupled to said telecommunications network, the bidding, matching and information exchange method comprising:

gathering, in said data structure on said server, said meeting requirement data as an inquiry from an inquiring meeting planner via one or more client computers;

searching said data structure on said server for hospitality facility data matching the meeting requirement data inquiry, matching the meeting requirement data and the hospitality facility data by said server, and obtaining search results;

conducting an analysis by said server of one of said meeting requirement data inquiry or said search results based upon a class of meeting planners which includes said inquiring meeting planner;

based upon said analysis, one of altering said search through said data structure on said server or altering said search results from said data structure on said server;

from said server via said telecommunications network, generating a communication to a planning supervisor based upon said search or said search results; and exchanging meeting requirement data and contact data based upon said search results between said inquiring meeting planner and selected vendors associated with hospitality facility data encompassed in said search results via respective client computers over said telecommunications network from said server.

3. An adaptive computerized bidding, matching and information exchange method accessible on a telecommunications network for matching hospitality facility data, representing vendors furnishing hotel facilities, meeting room facilities or other hospitality facilities, said hospitality facility data including at least vendor contact data, location data, room quantity data, date available range data, and meeting room data, said hospitality facility data matched with meeting requirement data, representing respective necessities of a plurality of meeting planners for a corresponding plurality of meetings or events, said meeting requirement data including at least meeting planner contact data, facilities requirement data, date range data and price data, said hospitality facility data and said meeting requirement data organized in a data structure accessible via a plurality of client computers coupled to said telecommunications network, said data structure stored in a server also accessible and coupled to said telecommunications network, the bidding, matching and information exchange method comprising:

gathering, in said data structure on said server, said meeting requirement data as an inquiry from an inquiring meeting planner via one or more client computers;

searching said data structure on said server for hospitality facility data matching the meeting requirement data inquiry, matching the meeting requirement data and the hospitality facility data by said server, and obtaining search results;

conducting an analysis by said server of one of said meeting requirement data inquiry or said search results with predetermined parameters set for a class of meeting planners which includes said inquiring meeting planner;

based upon said analysis, one of altering said search through said data structure on said server or altering said search results from said data structure on said server;

changing said predetermined parameters in said analysis based upon instructions from a planning supervisor received via said telecommunications network; and, exchanging meeting requirement data and contact data based upon said search results between said inquiring meeting planner and selected vendors associated with hospitality facility data encompassed in said search results via respective client computers over said telecommunications network from said server.

4. An adaptive information exchange method as claimed in claim 3 wherein said analysis is a filter which limits, modifies or expands said search based upon said class of meeting planners including said inquiring meeting planner.

5. An adaptive information exchange method as claimed in claim 3 wherein said search and said analysis are iterative processes.

6. An adaptive information exchange method as claimed in claim 3 including generating a communication to said planning supervisor based upon said search or said search results.

7. An adaptive information exchange method as claimed in claim 6 wherein said communication to said planning supervisor occurs after said search and said changing said predetermined parameters occurs after said communication.

8. An adaptive information exchange method as claimed in claim 3 including sending said search results to vendors listed thereon without identifying said meeting planner contact data; gathering bids from interested listed vendors; and generating a report of said bids for said planning supervisor.

9. An adaptive information exchange method as claimed in claim 3 wherein said analysis includes determining one characteristic from the group of characteristics including total hospitality cost for a predetermined time period; average price per room per said search results, location, room quantity, and meeting room data.

10. An adaptive computerized bidding, matching and information exchange method accessible on a telecommunications network for matching hospitality facility data, representing vendors furnishing hotel facilities, meeting room facilities or other hospitality facilities, said hospitality facility data including at least vendor contact data, location data, room quantity data, date available range data, and meeting room data, said hospitality facility data matched with meeting requirement data, representing respective necessities of a plurality of meeting planners for a corresponding plurality of meetings or events, said meeting requirement data including at least meeting planner contact data, facilities requirement data, date range data and price data, said hospitality facility data and said meeting requirement data organized in a data structure accessible via a plurality of client computers coupled to said telecommunications network, said data structure stored in a server also accessible and coupled to said telecommunications network, the bidding, matching and information exchange method comprising:

gathering, in said data structure on said server, said meeting requirement data as an inquiry from an inquiring meeting planner via one or more client computers;

searching said data structure on said server for hospitality facility data matching the meeting requirement data inquiry, matching the meeting requirement data and the hospitality facility data by said server, and obtaining search results;

conducting an analysis by said server of one of said meeting requirement data inquiry or said search results based upon a predetermined characteristic and generating a communication to a vendor promoter based thereon;

changing said search results upon instructions from said vendor promoter obtained via said telecommunications network; and exchanging meeting requirement data and contact data based upon said search results between said inquiring meeting planner and selected vendors associated with hospitality facility data encompassed in said search results via respective client computers over said telecommunications network from said server.

11. An adaptive information exchange method as claimed in claim 10 wherein said predetermined characteristic for said analysis includes determining whether said meeting requirement data exceeds thresholds for location, room quantity or meeting room data.

12. An adaptive information exchange method as claimed in claim 10 wherein said search and said analysis are iterative processes.

13. An adaptive information exchange method as claimed in claim 10 wherein generating said communication to said vendor promoter is based upon pre-set hospitality facility data in said search results.

14. An adaptive information exchange method as claimed in claim 10 including sending said search results to vendors listed thereon without identifying said meeting planner contact data; gathering bids from interested listed vendors; and generating a report of said bids for said vendor promoter.

15. A computerized adaptive client-based input method, operative in conjunction with a computerized bidding, matching and information exchange method, accessible on a telecommunications network for matching hospitality facility data, representing vendors furnishing hotel facilities, meeting room facilities or other hospitality facilities, said hospitality facility data including at least vendor contact data, location data, room quantity data, date available range data, and meeting room data, said hospitality facility data matched with meeting requirement data, representing respective necessities of a plurality of meeting planners for a corresponding plurality of meetings or events, said meeting requirement data including at least meeting planner contact data, facilities requirement data, date range data and price data, said hospitality facility data and said meeting requirement data organized in a data structure accessible via a plurality of client computers coupled to said telecommunications network, said data structure stored in a server also accessible and coupled to said telecommunications network, the adaptive client-based input method comprising:

gathering, in said data structure on said server, said meeting requirement data as an inquiry from an inquiring meeting planner;

transmitting instructions from at least one client computer to said server for searching said data structure in said server for hospitality facility data matching the meeting requirement data inquiry, matching the meeting requirement data and the hospitality facility data by said server;

obtaining search results from said data structure in said server;

conducting an analysis on said server of one of said meeting requirement data inquiry or said search results with predetermined parameters set for a class of meeting planners which includes said inquiring meeting planner;

based upon said analysis, one of altering said search with corresponding search instructions for said data structure by said server or altering said search results from said data structure on said server;

changing said predetermined parameters used said analysis based upon instructions from a planning supervisor via said telecommunications network; and, exchanging meeting requirement data and contact data with said data structure based upon said search results and selected vendors associated with hospitality facility data encompassed in said search results via respective client computers over said telecommunications network from said server.

16. An adaptive client-based input method as claimed in claim 15 wherein said analysis is a filter which limits, modifies or expands either said instructions for searching or the obtained search results based upon said class of meeting planners including said inquiring meeting planner.

17. An adaptive client-based input method as claimed in claim 15 wherein said analysis, transmitting instructions for searching, and altering said search with corresponding search instructions are iterative processes.

18. An adaptive client-based input method as claimed in claim 15 including generating a communication to said planning supervisor based upon gathering said meeting requirement data, transmitting instructions for searching, or the obtained search results.

19. An adaptive client-based input method as claimed in claim 18 wherein said communication to said planning supervisor occurs after obtaining said search results and said changing said predetermined parameters occurs after said communication.

20. An adaptive client-based input method as claimed in claim 15 including obtaining a report of said bidding data from said data structure for said planning supervisor.

21. An adaptive client-based input method as claimed in claim 15 wherein said analysis includes determining one characteristic from the group of characteristics including total hospitality cost for a predetermined time period; average price per room per the obtained search results, location, room quantity, and meeting room data.

22. A computerized adaptive client-based output method, operative in conjunction with a bidding, matching and information exchange method, accessible on a telecommunications network for matching hospitality facility data, representing vendors furnishing hotel facilities, meeting room facilities or other hospitality facilities, said hospitality facility data including at least vendor contact data, location data, room quantity data, date available range data, and meeting room data, said hospitality facility data matched with meeting requirement data, representing respective necessities of a plurality of meeting planners for a corresponding plurality of meetings or events, said meeting requirement data including at least meeting planner contact data, facilities requirement data, date range data and price data, said hospitality facility data and said meeting requirement data organized in a data structure accessible via a plurality of client computers coupled to said telecommunications network, said data structure stored in a server also accessible and coupled to said telecommunications network, the adaptive client-based output method comprising:
- obtaining search results on at least one client computer via said telecommunications network from said data structure in said server for hospitality facility data matching a meeting requirement data inquiry;
- matching the meeting requirement data and the hospitality facility data by said server;
- conducting an analysis of the obtained search results by said server based upon a predetermined characteristic and generating a communication to a vendor promoter based thereon;
- transmitting instructions via said telecommunications network to change said search results upon a response from said vendor promoter on a respective client computer; and
- exchanging meeting requirement data and contact data with said data structure via said telecommunications network based upon said search results.

23. An adaptive client-based output method as claimed in claim 22 wherein said predetermined characteristic for said analysis includes determining whether said obtained search results exceeds thresholds for location, room quantity or meeting room data.

24. An adaptive client-based output method as claimed in claim 22 wherein conducting an analysis and transmitting instructions to change are iterative processes.

25. An adaptive client-based output method as claimed in claim 22 wherein generating said communication to said vendor promoter is based upon pre-set hospitality facility data in the obtained search results.

26. An adaptive client-based output method as claimed in claim 22 including generating a report of said bidding data from said data structure for said vendor promoter.

27. An adaptive computerized bidding and matching system accessible on a telecommunications network for matching hospitality facility data, representing vendors furnishing hotel facilities, meeting room facilities or other hospitality facilities, said hospitality facility data including at least vendor contact data, location data, room quantity data, date available range data, and meeting room data, said hospitality facility data matched with meeting requirement data, representing respective necessities of a plurality of meeting planners for a corresponding plurality of meetings or events, said meeting requirement data including at least meeting planner contact data, facilities requirement data, date range data and price data, said hospitality facility data and said meeting requirement data organized in a data structure accessible via said telecommunications network, the adaptive computerized bidding and matching system comprising:
- an input device accepting said meeting requirement data as an inquiry from an inquiring meeting planner;
- means for searching said data structure for hospitality facility data matching the meeting requirement data inquiry and obtaining search results;
- an analyzer determining whether said meeting requirement data inquiry or said search results correlate to predetermined parameters set for a class of meeting planners which includes said inquiring meeting planner;
- means, coupled to said analyzer, for altering said search results based upon the correlation to said predetermined parameters;
- adaptive means for changing said predetermined parameters in said analyzer based either the obtained search results, or the altered search results, a pre-set characteristic of said meeting requirement data inquiry or a further characteristic of said correlation to said predetermined parameters or a communication from a planning supervisor; and,
- a match and bid program utilizing said search results with an information exchanger handling communications between said inquiring meeting planner and selected vendors associated with hospitality facility data encompassed in said search results.

28. An adaptive computerized bidding and matching system as claimed in claim 27 wherein said adaptive means, coupled to said analyzer, defines an adaptive filter for said meeting requirement data inquiry and said means for searching said data structure.

29. An adaptive computerized bidding and matching system as claimed in claim 28 wherein said adaptive filter accepts a feedback communication from a planning supervisor.

30. An adaptive computerized bidding and matching system as claimed in claim 27 wherein said adaptive filter limits, modifies or expands said search results.

31. An adaptive computerized bidding and matching system as claimed in claim 27 including a communications module notifying said planning supervisor based upon said search or said search results.

32. An adaptive computerized bidding and matching system as claimed in claim 27 wherein said match and bid program includes means for sending said search results to vendors listed thereon without identifying said meeting planner contact data; means for gathering bids from interested listed vendors; and a report generator showing said bids for said planning supervisor.

33. An adaptive computerized bidding and matching system as claimed in claim 27 wherein said predetermined parameters include at least one parameter from the group of parameters including total hospitality cost for a predetermined time period; average price per room per said search results, location, room quantity, and meeting room data.

34. An adaptive computerized bidding and matching system as claimed in claim 27 wherein said analyzer includes a summation module for said inquiring meeting planner.

35. An adaptive computerized bidding and matching system as claimed in claim 27 wherein said summation module captures bid data from said data structure for said inquiring meeting planner.

36. A computer readable medium for an adaptive client-based input method, operative in conjunction with a computerized bidding, matching and information exchange method, accessible on a telecommunications network for matching hospitality facility data, representing vendors furnishing hotel facilities, meeting room facilities or other hospitality facilities, said hospitality facility data including at least vendor contact data, location data, room quantity data, date available range data, and meeting room data, said hospitality facility data matched with meeting requirement data, representing respective necessities of a plurality of meeting planners for a corresponding plurality of meetings or events, said meeting requirement data including at least meeting planner contact data, facilities requirement data, date range data and price data, said hospitality facility data and said meeting requirement data organized in a data structure accessible via said telecommunications network, the computer readable medium for an adaptive client-based input comprising:

gathering said meeting requirement data as an inquiry from an inquiring meeting planner;

transmitting instructions for searching said data structure for hospitality facility data matching the meeting requirement data inquiry;

obtaining search results from said data structure;

conducting an analysis of one of said meeting requirement data inquiry or said search results with predetermined parameters set for a class of meeting planners which includes said inquiring meeting planner;

based upon said analysis, one of altering said search with corresponding search instructions for said data structure or altering said search results;

changing said predetermined parameters used said analysis based upon instructions from a planning supervisor; and, exchanging information and bidding data with said data structure based upon said search results and selected vendors associated with hospitality facility data encompassed in said search results.

37. A computer readable medium for an adaptive client-based input method as claimed in claim 36 wherein said analysis is a filter which limits, modifies or expands either said instructions for searching or the obtained search results based upon said class of meeting planners including said inquiring meeting planner.

38. A computer readable medium for an adaptive client-based input method as claimed in claim 36 wherein said analysis, transmitting instructions for searching, and altering said search with corresponding search instructions are iterative processes.

39. A computer readable medium for an adaptive client-based input method as claimed in claim 36 including generating a communication to said planning supervisor based upon gathering said meeting requirement data, transmitting instructions for searching, or the obtained search results.

40. A computer readable medium for an adaptive client-based input method as claimed in claim 39 wherein said communication to said planning supervisor occurs after obtaining said search results and said changing said predetermined parameters occurs after said communication.

41. A computer readable medium for an adaptive client-based input method as claimed in claim 36 including obtaining a report of said bidding data from said data structure for said planning supervisor.

42. A computer readable medium for an adaptive client-based input method as claimed in claim 36 wherein said analysis includes determining one characteristic from the group of characteristics including total hospitality cost for a predetermined time period; average price per room per the obtained search results, location, room quantity, and meeting room data.

43. A computer readable medium for an adaptive client-based output method, operative in conjunction with a bidding, matching and information exchange method, accessible on a telecommunications network for matching hospitality facility data, representing vendors furnishing hotel facilities, meeting room facilities or other hospitality facilities, said hospitality facility data including at least vendor contact data, location data, room quantity data, date available range data, and meeting room data, said hospitality facility data matched with meeting requirement data, representing respective necessities of a plurality of meeting planners for a corresponding plurality of meetings or events, said meeting requirement data including at least meeting planner contact data, facilities requirement data, date range data and price data, said hospitality facility data and said meeting requirement data organized in a data structure accessible via said telecommunications network, the computer readable medium for an adaptive client-based output method comprising:

obtaining search results from said data structure for hospitality facility data matching a meeting requirement data inquiry;

conducting an analysis of the obtained search results based upon a predetermined characteristic and generating a communication to a vendor promoter based thereon;

transmitting instructions to change said search results upon a response from said vendor promoter; and exchanging information and bidding data with said data structure based upon said search results.

44. A computer readable medium for an adaptive client-based output method as claimed in claim 43 wherein said predetermined characteristic for said analysis includes determining whether said obtained search results exceeds thresholds for location, room quantity or meeting room data.

45. A computer readable medium for an adaptive client-based output method as claimed in claim 43 wherein conducting an analysis and transmitting instructions to change are iterative processes.

46. A computer readable medium for an adaptive client-based output method as claimed in claim 43 wherein generating said communication to said vendor promoter is based upon pre-set hospitality facility data in the obtained search results.

47. A computer readable medium for an adaptive client-based output method as claimed in claim 43 including generating a report of said bidding data from said data structure for said vendor promoter.

* * * * *